United States Patent
Long et al.

(10) Patent No.: US 7,143,007 B2
(45) Date of Patent: Nov. 28, 2006

(54) EQUIPMENT COMPONENT MONITORING AND REPLACEMENT MANAGEMENT SYSTEM

(75) Inventors: Wayne R. Long, Eagan, MN (US); Michael L. Booth, Columbia Heights, MN (US); Aaron D. Waller, Farmington, MN (US); Anders Holme, Stavanger (NO); Per Reidar Ørke, Hafrsfjord (NO); Erik Frafjord, Sola (NO); Jon Grude Gjedebo, London (GB)

(73) Assignee: Hydralift AmClyde, Inc., St. Paul, MN (US)

( * ) Notice: Subject to any disclaimer, the term of this patent is extended or adjusted under 35 U.S.C. 154(b) by 0 days.

(21) Appl. No.: 10/965,706

(22) Filed: Oct. 14, 2004

(65) Prior Publication Data

US 2005/0143956 A1    Jun. 30, 2005

Related U.S. Application Data

(60) Provisional application No. 60/567,705, filed on May 3, 2004, provisional application No. 60/512,108, filed on Oct. 17, 2003.

(51) Int. Cl.
 *G06F 17/00* (2006.01)
(52) U.S. Cl. .................. 702/184; 702/34; 702/183; 702/185
(58) Field of Classification Search .............. 702/184, 702/33–36, 42, 58, 59, 113, 122, 127, 118, 702/182, 183, 185, 187, 188, 177, 179, 181; 73/577, 760, 787, 789, 781, 783, 794
See application file for complete search history.

(56) References Cited

U.S. PATENT DOCUMENTS

| | | | | |
|---|---|---|---|---|
| 4,764,882 A * | 8/1988 | Braschel et al. | ............... | 702/42 |
| 5,210,704 A * | 5/1993 | Husseiny | ...................... | 702/34 |
| 5,251,144 A * | 10/1993 | Ramamurthi | ............... | 700/177 |
| 6,408,258 B1 * | 6/2002 | Richer | ........................ | 702/182 |
| 6,490,543 B1 * | 12/2002 | Jaw | .............................. | 702/184 |
| 6,532,435 B1 | 3/2003 | Aoshika et al. | ............. | 702/188 |
| 6,615,103 B1 * | 9/2003 | Fujishima et al. | .......... | 700/175 |
| 6,748,305 B1 * | 6/2004 | Klausner et al. | ............... | 701/35 |
| 6,876,908 B1 * | 4/2005 | Cramer et al. | ................ | 701/30 |
| 2002/0087419 A1 | 7/2002 | Andersson et al. | ........... | 705/26 |
| 2004/0204817 A1 * | 10/2004 | Yurgil | ........................ | 701/114 |
| 2005/0080525 A1 * | 4/2005 | Hoeflacher et al. | ........... | 701/29 |

\* cited by examiner

*Primary Examiner*—Hal Wachsman
(74) *Attorney, Agent, or Firm*—Dorsey & Whitney LLP

(57) ABSTRACT

A computer system for managing replacement components for equipment having a plurality of components, each component having a limited useful life, has a computer program module defining a duty profile comprising a plurality of usage cases for the equipment, each usage case involving two or more of the components and specified operating conditions for the involved components during execution of the usage cases. A further program module determines a theoretical useful life for each component involved in a duty profile, based on component useful life data under specified operating conditions; and sensors determine and monitor the occurrence of equipment operation corresponding to a usage case and measur actual operating conditions and number of operations. A further program module computes an adjusted theoretical useful life for a component experiencing operations, based on a comparison of actual operating conditions to those assumed for the usage case.

44 Claims, 28 Drawing Sheets

FIG. 4a

AMClyde ONLINE

| Home | Equipment | Contact Us | Log Off |

Crane - Maintenance Page

Home Map | DB50 | Crane

| Inspection Info | Inspection Entry | Inspections Due Today | Inspection History |

Print List

WARNING
- Failure to do the necessary maintenance can result in damage or failure of the crane or derrick.
- Permit only qualified service personnel who have received training in the maintenance, inspection, and adjustment of the equipment to do the maintenance, inspection, and adjustment procedures.
- Use caution when doing maintenance on or near electrical equipment. Electrical equipment must be maintained and operated according to applicable standards.

As Necessary
- Air system lubricator
- Air system anti-freezer
- Slew ring bearing
- Electronic drive control system
- Air conditioning
- Hydraulic bolt tensioner
- Overhead chain hoist

| Interval | Item | |
|---|---|---|
| As necessary or as recommended by the manufacturer, whichever is more frequent | ☐ | Paint any damaged paint surfaces to prevent corrosion. Damaged paint can indicate underlying structural hazard (see "structural members and welds" in "Periodic inspection") – determine whether further inspection is required before repairing paint damage. Notify appropriate inspection personnel if necessary. |

Links | Vendors | Information

FIG. 4c

| Actual Duty Profile For Equipment X | | | | |
|---|---|---|---|---|
| Usage Case | Component A (rotating shaft) | Component B (hydraulic ram) | Component C (sheave) | Profile Usage Case Occurrences Over Useful Lifespan of Equipment |
| 1 | C1 (1,000 ft. lbs.) | C2 (50 ft. lbs.) | C3 (na) | N1 (100) |
| 2 | C4 (na) | C5 (500 ft. lbs.) | C6 (1,000) | N2 (50) |
| 3 | C7 (3,000 ft. lbs.) | C8 (2,000 ft. lbs.) | C9 (6,000) | N3 (125) |
| Theoretical Component Usage Profile (TCUP) | N1 x C1 + N2 x C4 + N3 x C7 = $TCUP_A$ (475,000 ft. lbs.) | N1 x C2 + N2 x C5 + N3 x C8 = $TCUP_B$ (280,000 ft. lbs.) | N1 x C3 + N2 x C6 + N3 x C9 = $TCUP_C$ (800,000 ft. lbs.) | |
| Wear/Stress/Strain rating (WSSR) of actual component utilized in Equipment A | $WSSR_A$ (475,000 ft. lbs.) | $WSSR_B$ (392,000 ft. lbs.) | $WSSR_C$ (400,000 ft. lbs.) Note: for the effective $WSSR_C$, multiply 400k by two because two Component C's are needed to reach the 800k $TCUP_C$ | |
| Theoretical Component Useful Life Under Assumed Duty Profile for a single Component | 25 years | 35 years | 12.5 years | |

FIG. 5

| Actual Duty Profile For Equipment X | | | | Actual Profile Usage Case Occurrences Over Past Two Years |
|---|---|---|---|---|
| Usage Case | Component A (rotating shaft) | Component B (hydraulic ram) | Component C (sheave) | |
| 1 | C1 (2,000 ft. lbs.) | C2 (25 ft. lbs.) | C3 (na) | N1 (10) |
| 2 | C4 (na) | C5 (125 ft. lbs.) | C6 (1,000) | N2 (5) |
| 3 | C7 (10,000 ft. lbs.) | C8 (500 ft. lbs.) | C9 (6,000) | N3 (12) |
| Actual Component Usage (ACU) | N1 x C1 + N2 x C4 + N3 x C7 = $ACU_A$ (140,000 ft. lbs.) | N1 x C2 + N2 x C5 + N3 x C8 = $ACU_B$ (6,875 ft. lbs.) | N1 x C3 + N2 x C6 + N3 x C9 = $ACU_C$ (77,000 ft. lbs.) | |
| Theoretical Life Used in Two Years ($TLU_{2y}$) | ($TCUP_A$/ selected design lifetime) x actual years of use = $TLU_{2y}$ (38,000) | ($TCUP_B$/ selected design lifetime) x actual years of use = $TLU_{2y}$ (22,400) | ($TCUP_C$/ selected design lifetime) x actual years of use = $TLU_{2y}$ (64,000) | |
| Actual Percent of Life Used | $ACU_A$ / $WSSR_A$ = % Life Used for Comp. A (29.5%) | $ACU_B$ / $WSSR_B$ = % Life Used for Comp. B (1.75%) | $ACU_C$ / $WSSR_B$ = % Life Used for Comp. C (10%) | |

FIG. 6

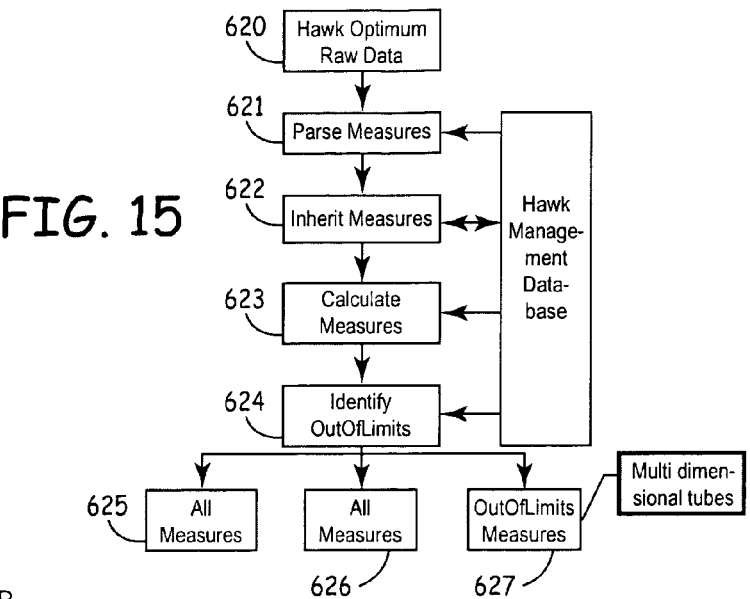

FIG. 15

EXAMPLE HEX MUD PUMP
Logged data:

| Press_Pushrod_Actual | MPa |
|---|---|
| Press_Change | Bar |
| Press_Discharge | MPa |
| FaultCode_Drive A | |
| FaultCode_DriveB | |
| Temp_ClosedLoopOil | Celsius |
| Jog Switch | 0/1 |
| Leak_Cyl | # |
| Leak_Percent | % |
| Press_LinerWash | Bar |
| Hours_LoadWeighted | Hr |
| Press_LubeOil | Bar |
| Temp_LubeOil_Hi | Celsius |
| Temp_MortoA_BearingD | Celsius |
| Temp_MotorA_StatorA | Celsius |
| Temp_MotorA_StatorB | Celsius |
| Temp_MotorA_BearingND | Celsius |
| Temp_MotorB_BearingD | Celsius |
| Temp_MotorB_StatorA | Celsius |
| Temp_MotorB_StatorB | Celsius |
| Temp_MotorB_BearingND | Celsius |
| MP On (Start/Stop) | 1/0 |
| Temp_Mud | DegC |
| Hours_Running | Hr |
| Service Mode Switch (0-7) | Number |
| Press_Pushrod_Set | MPa |
| SPM | SPM |
| Strokes_Total | STK |
| Torque_MotorA | Nm |
| Torque_MotorB | Nm |
| Temp_CoolWater_Lo | Celsius |
| Temp_CoolWater_Hi | Celsius |
| Temp_LubeOil_Lo | Celsius |
| Flow_CoolWater | LPM |
| Flow_LubeOil | LPM |

FIG. 16

Constants and help factors:

| Description | Symbol | Value | Units |
|---|---|---|---|
| Number of cylinders | n_cyl | 6 | |
| Liner diameter | ID_liner | 4,5 | in |
| Rated pump speed | S_rated | 212 | spm |
| Rated pressure | p_rated | 517,1 | bar |
| Rated motor torque (per motor) | Trq_rated | 11200 | Nm |
| Nominal motor speed | N_nom | 810 | rpm |
| Pinion teeth number | teeth_P | 34 | |
| Gear teeth number | teeth_g | 249 | |
| Piston stroke | s_piston | 300 | mm |
| Residual volume factor | c-resV | 1,14 | |
| Valve delay | t_delay | 0,007 | s |
| Loss stroke from valve seal cushion | s_vc | 1,7 | mm |
| Mud compressibility | C-mud | 4,4E-05 | 1/bar |
| Bearing load exponent | e | 3,33 | |
| Reference speed | S_ref | 74 | spm |
| Reference pressure | p_ref | 260 | bar |
| Density of lube oil | rho_oil | 860 | kg/m3 |
| Density of cooling water | rho_w | 1000 | kg/m3 |
| Specific heat capacity of lube oil | o_oil | 1950 | J/kg/K |
| Specific heat capacity of cooling water | cw | 4180 | J/kg/K |
| Rated motor power (both motors) | P_rated | 1900 | kW |
| Stroke volume per cylinder | V_cyl | 3,078 | litres |
| Gear ratio (motor speed/cam speed) | n_gear | 7,324 | |
| Load factor for lowest ref. load | w_D | 0,711 | |
| Weighted mean reference load factor | w_ref | 1,935 | |

Definitions of input variables:

- delta_t — time since previous sample (s)
- p_charge — charge pressure (bar)
- p_disch — discharge pressure (bar)
- S_pump — pump speed (spm)
- Trq_A — Torque from motor A (Nm)
- Trq_B — Torque from motor B (Nm)
- T_oil_in — temperature of lub oil into cooler (degC)
- T_oil_out — temperature of lub oil out of cooler (degC)
- T_water_in — temperature of lub oil into cooler (degC)
- T_water_out — temperature of lub oil out of cooler (degC)
- Q_oil — flow of lube oil (lpm)
- Q_water — flow of cooling water (lpm)

Post processed log parameters:

| Description | Symbol | Formula | Units |
|---|---|---|---|
| Normalized motor torque difference | diff_Trqn | $= 100 \cdot (\text{Trq\_A} + \text{Trq\_B})/\text{Trq\_rated}$ | % |
| Mech. power (from motor shafts) | P_mech | $= (\text{Trq\_A} + \text{Trq\_B}) \cdot \text{S\_pump} \cdot \text{PI}()/30 \cdot \text{n\_gear}/1000$ | kW |
| Nominal pump rate | Q_nom | $= \text{n\_cyl} \cdot \text{V\_cyl} \cdot \text{S\_pump}$ | lpm |
| Calculated volumetric efficiency | eta_V | $= 100 \cdot (1 - (\text{p\_disch} - \text{p\_charge}) \cdot \text{C\_mud} \cdot (0.5 + \text{c\_resV}) - 2 \cdot \text{s\_vc}/\text{s\_piston} - (\text{t\_delay} \cdot \text{S\_pump})^2/120)$ | % |
| Flow out | Q_out | $= \text{eta\_V}/100 \cdot \text{Q\_nom}$ | lpm |
| Hydraulic power | P_hyd | $= (\text{p\_disch} - \text{p\_charge}) \cdot \text{Q\_out}/600$ | kW |
| Cooling power oil | P_cool_w | $= (\text{T\_oil\_in} - \text{T\_oil\_out}) \cdot \text{cw} \cdot \text{rho\_w} \cdot \text{Q\_oil}/600$ | kW |
| Cooling power water | P_cool_oil | $= (\text{T\_water\_out} - \text{T\_water\_in}) \cdot \text{cw} \cdot \text{rho\_w} \cdot \text{Q\_coolw}/600$ | kW |
| Pump efficiency | eta_pump | $= 100 \cdot \text{P\_hyd}/(\text{P\_mech})$ | % |
| Relative pump power | P_rel | $= 100 \cdot \text{P\_mech}/\text{P\_rated}$ | % |
| Load factor | w | $= (2 \cdot \text{p\_disch}/\text{p\_rated})^e \cdot (2 \cdot \text{S\_pump}/\text{S\_rated})$ | |
| Pump running | r | $= \text{IF}(\text{S\_pump} < 0.02 \cdot \text{S\_rated}; 0; 1)$ | 0/1 |
| Accumulated running hours | t_hr | $= \text{t\_hr} + \text{r} \cdot \text{delta\_t}/3600$ | hr |
| Acc. load weighted running hours | t_hrw | $= \text{t\_hrw} + \text{r} \cdot \text{w} \cdot \text{delta\_t}/3600$ | hr |

Additional formulas:
- $\text{kW} = 2 \cdot \text{N\_nom} \cdot \text{PI}()/30 \cdot \text{T\_rated}/1000$
- $\text{litres} = \text{PI}()/4 \cdot (\text{ID\_liner} \cdot 0.0254)^2 \cdot \text{s\_piston}$
- $= \text{teeth\_g}/\text{teeth\_p}$
- $= ((\text{ID\_liner}/4.5)^2 \cdot (2 \cdot \text{p\_ref}/\text{p\_rated}))^e \cdot (2 \cdot \text{S\_ref}/\text{S\_rated})$
- $= w\_0 \cdot (0.15^2 \cdot e + 0.4 + 0.4^2 + 0.05) \cdot (0.5)^e \cdot \text{Srated}/\text{S\_ref}$

FIG. 17

Calculations
Post Processed Log parameters:

| Parameter | Symbol | | Unit | Formula |
|---|---|---|---|---|
| Normalized motor torque difference | diff Trqn | _ | % | = 100* (Trq A - Trq B)/Trq rated |
| Mech. power (from motor shafts) | P mech | _ | kW | = (Trq A+Trq B)*S pump*PI()/30*n gear/1000 |
| Nominal pump rate | Q nom | _ | lp m | = n cyl*V cyl*S pump |
| Calculate volumetric efficiency | eta V | _ | % | = 100*(1 - (p disch-p charge)*C mud*(0.5+c resV) - 2*s vc/s piston - (t delays*S pump)^2/120) |
| Flow out | Q out | _ | lp m | = eta V/100*Q nom |
| Hydraulic power | P hyd | _ | kW | = (p disch-p charge)*Q out/600 |
| Cooling power oil | P cool w | _ | kW | = (T oil in - T oil out)*cw*rho w*Q oil/600 |
| Cooling power water | P cool oi l | _ | kW | =(T water out- T water in)*cw*rho w*Q coolw/600 |
| Pump efficiency | eta pump | _ | % | = 100*P hyd/(P mech) |
| Relative pump power | P rel | _ | % | = 100*P mech/P rated |
| Load factor | w | | | = (2*p disch/p rated)^e * (2*S pump/S rated) |
| Pump running | r | ‾ | 0/1 | = IF(S pump<0.02*S rate; 0; 1) |
| Accumulated running hours | t hr | ‾ | hr | = t hr + r*delta t/3600 |
| Acc. load weighted running hours | t hrw | _ | hr | = t hrw + r*w* delta t/3600 |

Performance Limits

| Limit ID | Limit Description | Logical Operator | Value |
|---|---|---|---|
| 1 | 80.0 ChargePressLoLoLim | 2 | 1.4 |
| 2 | 76.0 ChargePressLoLim | 2 | 1.5 |
| 3 | 88.0 ChargePressHiHiLim | 3 | 5.2 |
| 4 | 84.0 ChargePressLHiLim | 3 | 4.6 |
| 5 | 44.0 ClosedLoopTempLoLim | 2 | 10 |
| 6 | 48.0 ClosedLoopTempLoLoLim | 2 | 5 |
| 7 | 56.0 ClosedLoopTempHiHiLim | 3 | 70 |
| 8 | 52.0 ClosedLoopTempHiLim | 3 | 65 |
| 9 | 40.0 LinerWashPressLoLoLim | 2 | 0.2 |
| 10 | 36.0 LinerWashPressLoLim | 2 | 0.5 |
| 11 | 8.0 Lube Oil PressLoLoLim | 2 | 0.5 |
| 12 | 4.0 LubeOilPressLoLim | 2 | 1 |
| 13 | 16.0 LubeOilPresHiHiLim | 3 | 4 |
| 14 | 12.0 LubeOilPressHiLim | 3 | 3.5 |

FIG. 18

2D Performance Limits

| Equipment ID | Signal Category ID | Configuration ID | Dim1 | Dim2 | Value |
|---|---|---|---|---|---|
| 4 | 38 | 1 | 8.1 | 0 | 15 |
| 4 | 38 | 1 | 8.1 | 0.5 | 15 |
| 4 | 38 | 1 | 8.1 | 1 | 15 |
| 4 | 38 | 1 | 8.1 | 1.5 | 15 |
| 4 | 38 | 1 | 8.1 | 2 | 15 |
| 4 | 38 | 1 | 8.1 | 2.5 | 0 |
| 4 | 38 | 1 | 10 | 0 | 15 |
| 4 | 38 | 1 | 10 | 0.5 | 15 |
| 4 | 38 | 1 | 10 | 1 | 15 |
| 4 | 38 | 1 | 10 | 1.5 | 15 |
| 4 | 38 | 1 | 10 | 2 | 15 |
| 4 | 38 | 1 | 10 | 2.5 | 0 |
| 4 | 38 | 1 | 15 | 0 | 15 |
| 4 | 38 | 1 | 15 | 0.5 | 15 |
| 4 | 38 | 1 | 15 | 1 | 15 |
| 4 | 38 | 1 | 15 | 1.5 | 15 |
| 4 | 38 | 1 | 15 | 2 | 15 |
| 4 | 38 | 1 | 15 | 2.5 | 0 |
| 4 | 38 | 1 | 20 | 0 | 15 |
| 4 | 38 | 1 | 20 | 0.5 | 15 |
| 4 | 38 | 1 | 20 | 1 | 15 |
| 4 | 38 | 1 | 20 | 1.5 | 15 |
| 4 | 38 | 1 | 20 | 2 | 15 |
| 4 | 38 | 1 | 20 | 2.5 | 0 |

FIG. 26

EQUIPMENT COMPONENT MONITORING AND REPLACEMENT MANAGEMENT SYSTEM

CROSS-REFERENCE RELATED APPLICATIONS

This application claims priority to U.S. Provisional Application No. 60/512,108, filed on Oct. 17, 2003 and U.S. Provisional Application No. 60/567,705, filed on May 3, 2004, the contents of both applications are hereby incorporated in their entirety by reference.

BACKGROUND OF THE INVENTION

The present invention relates to apparatus and methods for monitoring and managing the life cycle of equipment. More specifically, the present invention relates to apparatus and methods for predicting preventive maintenance periods and component replacement needs.

Machinery requires periodic diagnostic maintenance to detect machine part wear, predict failure, and locate problems. In modern machinery, such as marine machines, cranes, automatic transmissions, turboshaft engines, paper mills, rolling mills, aircraft engines, helicopter transmissions, and high-speed process machinery, failure of bearings, gears and other equipment frequently result in costly productivity loss, severe and expensive secondary damage, and potentially life threatening situations. Equipment failures occur because, over time, gear/bearing assemblies and other parts that are stressed experience wear and damage, such as spalled bearing rolling elements, pitting on gear teeth, and bearing race damage.

To ensure safety and avoid unscheduled interruptions, critical components are typically replaced at conservative fixed intervals based simply on periods of use. However, wear factors such as load magnitudes, displacement distances, time periods under load, and speeds of displacement may heavily influence equipment wear and damage. Consequently, when the wear factors are above normal for a significant period of time, the equipment can prematurely fail. On the other hand, when the wear factors are minimal for a significant period of time, simply relying on periods of use to trigger component replacement can increase the costs of operation. This is because useful component life is wasted, costs are increased due to more frequent maintenance, and productivity is decreased due to more frequent maintenance shutdowns.

There is a need in the art for a system that will more accurately predict preventive maintenance periods and define component replacement needs. Also, there is a need in the art for a method that will more accurately predict preventive maintenance periods and component replacement needs.

BRIEF SUMMARY OF THE INVENTION

The present invention, in one embodiment, is a system for managing replaceable components for equipment having a plurality of components, each with a limited useful life. The system comprises: a computer with at least one processor; a computer program module for defining a duty profile comprising a plurality of usage cases for the equipment, each usage case involving two or more of the plurality of components and specified operating conditions assumed to be experienced by the involved components during the execution of each of the usage cases; and a computer program module for determining a theoretical useful life for each component involved in a duty profile, the theoretical useful life being based on component wear/stress/strain parameters assumed to occur under the specified operating conditions. The systems further comprises sensors for determining and monitoring the occurrence of equipment operation corresponding to a usage case and making measurements of actual operating conditions experienced in the operation; a memory for storing the measurements of actual operating conditions for the plurality of components; and a computer program module for computing an adjusted theoretical useful life for a component after it has experienced one or more operations, by: responsive to the measurements of actual operating conditions, calculating one or more calculated wear/stress/strain parameters for each operation and accumulating these calculated parameters for such component; and, based on a comparison of the accumulated, calculated wear/stress/strain parameters from actual operating conditions to accumulated wear/stress/strain parameters assumed to occur under the specified operating conditions in the determination of a theoretical useful life, determining the amount of the adjusted theoretical useful life consumed in the one or more operations.

The present invention, in another embodiment, is a method for managing maintenance of remote equipment with replaceable components. The method comprises: providing on the remote equipment a plurality of sensors that sense operating conditions for each of one or more replaceable components; receiving at a database operating condition data sensed by the plurality of sensors; comparing at least a portion of the sensed data to one or more design duty profile parameters for the remote equipment; and in response to the step of comparing, identifying one or more replaceable components that are recommended for replacement, with a suggested future date for replacement.

The present invention, in another embodiment, is a computer program stored on computer readable media for use in a system for managing replacement components for equipment having a plurality of components each with a limited useful life. The program includes software components as described above for the system embodying the invention.

Yet another embodiment of the present invention provides an automated web-based service designed to let clients interface online or offline with any drilling equipment coupled to the system. On-site operators or personnel remote from the site, e.g., the headquarters of the company; can utilize information and knowledge stored among huge amounts of data. A part of the concept is to acquire and redirect existing equipment instrumentation signals into a centralized database. By also applying corporate knowledge about the equipment, like theoretical models, diagnostic algorithms, statistics, work load accumulation, etc, a service provider can provide value added data back to the company operating the equipment. The system may deliver last hour statistics from one specific machine, or advanced diagnostic algorithms applied across equipment operated by different companies. The system may help pinpointing potential areas for improved performance as well as assisting in predicting and planning on-demand maintenance.

There are two main approaches to equipment condition analysis. One is based on advanced engineering and mathematical modeling, which provide a reference for comparing measured operational data with theoretical data. The second, more common approach is that there is no known reliable model or theoretical knowledge for operation and wear on the equipment. In that case, empirical analysis of trends and patterns in large amounts of collected data, from a large number of equipment units, may over time provide better and better interpretation of equipment conditions.

Whatever method is used, better condition models will enable calculation of weighted equipment use, i.e., use measured not just by time or repetitions of the operations but based on load or other conditions that effect equipment life. Obviously, there is a huge difference between 1000 running hours with heavy load and 1000 running hours without load at all. Some parts wear faster with certain operating conditions, e.g. higher speeds, others with different conditions, e.g., higher load. It is possible to define a "wear-map" for each component of any machine. By combining this wear-map with operational data, a figure for remaining lifetime can be estimated for wear parts. This will form the basis for a Reliability Centered Maintenance (RCM) approach, where from current condition and remaining lifetime data, one can dynamically estimate service and inspection intervals and spare part requirements. This provides for longer service and inspection intervals with little or no increase in chances of failure. Reliability and safety can also be improved.

A typical system according to a further embodiment of the invention may comprise the following main elements:

Instrumentation (including sensors)
   This may be existing instrumentation on the equipment and/or new instrumentation
On-site computer—A physical data acquisition unit located on or near the monitored equipment and coupled to the instrumentation,
Server receiving data from a plurality of on-site computers and with capability to upgrade software in the on-site computer
Communication network, e.g., the Internet The RCM service may be in two modes: (1) Local monitoring—made on-site or within an existing company network; or (2) Performance monitoring—provided by one or a group of servers operated by a service provider. The local monitoring mode is intended for provision of raw data and simple statistics. The performance monitoring mode provides higher-level information, more deeply analyzed data, where the service provider's accumulated knowledge and machine competence has been applied to the raw data.

The system is designed to provide a single point of configuration for the service and for the equipment involved. In a dedicated web service, service administrators can configure all the elements of the service. The configuration process involves:
selecting equipment to monitor
selecting on-site computer type for data acquisition
selecting and configuring signals and parameters for the data logger
selecting and configuring calculations, filters and logging frequency for the data logger
selecting and configuring communication routes
selecting accumulated knowledge to be applied at the central server
defining and setting up company, plant and user accounts Based on the input, the management database in the central server may produce:
an XML configuration file to automatically set up all aspects of the data logger
an XML configuration file to automatically set up the local monitoring
an XML configuration file to automatically set up the local monitor content
automatic configuration and set up of database tables in the performance monitor
automatic configuration of the data receiver in the server—a logstream handler For each type of equipment or component there may be defined a empirical service model. This may be expressed in: algorithms; constants; performance limits, including 2D performance limits; and error codes. To facilitate incorporating empirical learning, the service provider regularly explores data collected and correlates it with known incidents, events, inspections and replacements. Various data-mining techniques can be used.

Also to facilitate empirical learning, the product manager will be authorized to explore and able to gather all equipments for all clients with the same view and with the same analysis tools. The manager can:
view parameters over time
view parameters versus load
view parameters versus any other categorized parameter
build statistics from data on
   Alarms
   Operation
   Maintenance
   Any other monitored and accumulated data
explore details surrounding accidents, events or incidents (e.g., broken parts)

Based on this, he can develop new algorithms and performance limits to implement in the data analysis processor for the equipment type.

While multiple embodiments are disclosed, still other embodiments of the present invention will become apparent to those skilled in the art from the following detailed description, which shows and describes illustrative embodiments of the invention. As will be realized, the invention is configurable in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 4a is a representation of a screen display for an internet entry portal into a computer system using the subject invention.

FIG. 4c is a representation of a screen display for an over-due or scheduled maintenance module.

FIG. 5 is a chart outlining a simplified component useful life analysis based on a theoretical duty profile and assumed operating conditions.

FIG. 6 is a chart outlining a simplified component useful life analysis as in FIG. 5 based on an actual duty profile and actual operating conditions.

FIG. 15 is a flow chart showing the steps involved in using the system of FIG. 11 to collect and analyze data.

FIG. 16 is table of typical parameters measured and logged for a mud pump.

FIG. 17 shows in the upper part some constants that are used in the calculations of calculated parameters and in the lower part a table of typical calculated parameters for a mud pump.

FIG. 18 shows a table containing the limit values for some critical parameters.

FIG. 26 shows a table that embodies a set of 2-dimensional performance limits.

DETAILED DESCRIPTION

Figure 1:
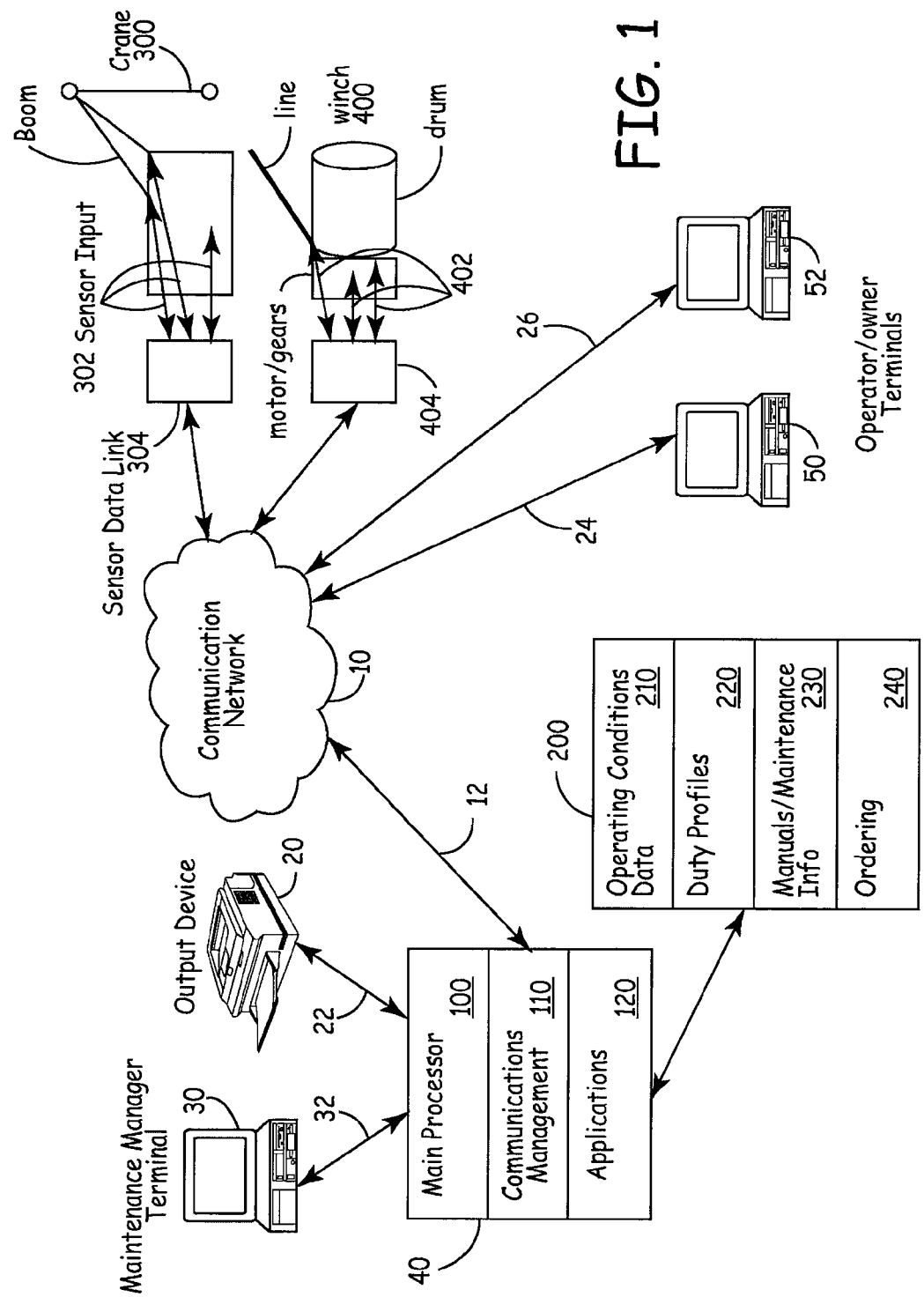
FIG. 1 is a schematic block diagram of one embodiment of the system of the present invention.

A. Equipment Design and Component Useful Life

When sophisticated equipment is designed, it is frequently defined with a planned useful life for the overall item of equipment. In reality, the design must take into consideration the useful life of a variety of components. For components that are critical to useful life, there is usually useful life data available from a manufacturer or other source that has actual test data on useful life and/or theoretical projections that are derived from actual useful life data. Typically, the useful life is specified for one or more defined, assumed operating conditions. An operating condition may be specified in terms of a rate, such as speed or load, and a time duration for experiencing that speed or load and/or a distance for maintaining the rate of work, but may also include other operating conditions, such as environmental factors that may affect useful life, e.g., operating temperature, humidity, corrosives or particulates present. The theoretical useful life for a component under the assumed operating conditions may then be expressed in terms of hours, days or other extended time interval. Typically a graph or set of graphs showing the effect of load, speed or other operating conditions on useful life will be available (or may be developed from existing data and theoretical or empirically derived formulas) as a design guide. In some instances, testing may need to be performed to establish accurate useful life data for a component. Whatever the source, equipment designers typically have reliable data that shows the relationship between a range of operating conditions and duration or repetitions of these conditions and the useful life of a component that that may be selected in the original design.

The useful life problem is not particularly difficult when a single component operating in one or a small number of modes is all that is under consideration. But in complex systems that carry out different operations, the useful life is more difficult to determine. One technique known by equipment designers is to define a duty profile. A duty profile defines certain operations that the equipment will perform and determines which are the key components that are involved in each operation and how they will be used in that operation. A duty profile may be described for an expected (or design goal) overall useful life of a piece of equipment. For example, the following might define a duty profile for a mooring system used on an offshore oil platform:

| Case No. | Operation |
|---|---|
| 1 | Raise 4000 ft of chain plus 10 metric tons anchor from sea bottom |
| 2 | Payout 4000 ft of chain with anchor on work boat |
| 3 | Inhaul 4000 ft of chain with anchor on work boat |
| 4 | Payout 8000 ft of wire rope with anchor on work boat |
| 5 | Inhaul 8000 ft of chain with anchor on work boat |
| 6 | Anchor setting on chain (300 ft + 100 ft) |
| 7 | Anchor setting on wire rope (500 ft + 100 ft) |
| 8 | 200 ft rig excursion on chain |
| 9 | 400 ft rig excursion on wire rope |

This duty cycle might be defined for an overall design life of 25 years with six rig moves per year and twelve rig excursions per year.

Alternatively, the duty profile might be described in terms of what functions equipment performs and, in any given time interval, what proportion of that time interval the equipment will be performing each operation or no operation. E.g., for a crane, the following duty profile might be used:

| Crane Function | % Usage |
|---|---|
| Boom hoist up | 7.5 |
| Boom hoist down | 7.5 |

-continued

| Crane Function | % Usage |
| --- | --- |
| Boom swing - accelerating | 3 |
| Boom swing - running | 9 |
| Boom swing - decelerating | 3 |
| Main fall hoist up | 7 |
| Main fall hoist down | 3 |
| Auxiliary fall hoist up | 18 |
| Auxiliary fall hoist down | 7 |
| Whip fall hoist up | 7.5 |
| Whip fall hoist down | 7.5 |
| Idle | 20 |

Returning to the first duty profile example, with such a duty profile defined the mooring system designer can then determine what key components (winches, motors, gear systems, shafts, bearings, wire rope, etc) are involved in each case and what operating conditions are required for each of the key components in each usage case. Most components will be involved in more than one case and may be operated at different operating conditions for different cases. This permits the computation of the duty profile requirements for each component for the assumed duty profile and the overall design life. The designer can then choose components with useful life characteristics that permit that component to be used for the assumed duty cycle for at least the overall design life. In some cases, the available components may not exactly fit the overall design life, and a component may be selected that is determined to have a useful life under the assumed duty profile that exceeds the overall design life. In other cases a component may not be available or may be cost prohibitive if it must meet the overall design life without replacement. In this case, a component useful life under the assumed duty profile (including assumed operating conditions) may be calculated and replacement of such component at intervals during the overall useful life can be planned.

However, the actual operating conditions for the equipment may be more or less severe than the duty profile assumed for the original design. For the owner or operator of the equipment, this has several implications. Maintenance on components may be required sooner or later than originally planned. Some components that were not expected to require maintenance during the design life will require maintenance where the duty profile is more severe that the duty profile used in the original design. It is much better to perform such maintenance on a scheduled basis than it is to have an emergency maintenance session in the midst of planned productive use of the equipment (which must now be interrupted) or to have an equipment failure. The latter may involve injury or damage causing losses that go far beyond loss of use of the equipment.

Past methods of addressing this situation include simply observing equipment operation and intervening when a near-failure or failure becomes observable. Alternatively, in some situations a sensor may be used to detect when an equipment component is near failure, e.g., because it deforms or requires greater than normal operating forces or its characteristics otherwise change. Such methods may defer maintenance until needed, but they may also result in equipment being operated to a point of failure or near-failure, where immediate, unplanned emergency stoppage is required.

B. Overview of Present Invention

The present invention attempts to reduce or avoid such unplanned interventions and to perform on a planned basis component replacement, even in situations where the duty profile in actual use is quite far from the duty profile used in the original design of the overall useful life.

FIG. 1 is a schematic block diagram indicating the elements of a data acquisition and management system in accordance with the present invention. This system is intended to manage component replacement for one or more items of equipment. FIG. 1 shows a crane 300 and a winch or mooring system 400 as examples; other types of equipment and more than two items of equipment may be managed by the system.

As will become apparent from the following discussion, the system monitors and collects data from operations performed by the equipment. More specifically, the system monitors and collects data from the operations performed by individual components that comprise the overall equipment. The system is able to provide "real-time" access to operations of the equipment and its components. The system allows direct comparison of actual operating conditions experienced by the equipment to the original theoretical duty profiles considered by the designers of the equipment. The system can then analyze the differences between the actual and theoretical duty profiles, develop information adjusting the original component useful life projections and schedule maintenance accordingly. The system uses the analysis to ascertain the amount of component useful life exhausted as of that point in time when operating condition data is collected.

As shown in FIG. 1, the system includes a communication network 10 and a computer system 40 with an output device 22 (such as a printer) and a maintenance manager terminal 30. The system further includes equipment operator/owner terminals 50, 52, two sensor data links 304 (for crane 300) and 404 (for winch system 400), each with corresponding multiple sensor inputs 302, 402 (for simplicity, only three inputs are shown for each of crane 300 and winch 400, although many more sensors could be placed on the equipment to provide inputs) that are associated with particular components and their operating parameters within crane 300 and winch 400.

The computer 40 includes a processor 100 with an operating system, communications management devices 110, and applications software 120. The applications 120 have access to a database 200 including files for operating conditions data 210, duty profiles 220, manuals/maintenance information 230, and ordering information 240, as well as other data that may be used by the system.

The communications management devices 110 communicate with a communication network 10 (which may be a public data network such as the Internet or a private network) via a communication link 12. The computer 40 is interconnected to the maintenance manager terminal 30 and the output device 20 via communication links 22 and 32, respectively. The operator/owner terminals 50, 52, which may use a browser to access a web site supported on computer 40, are interconnected to the communication network 10 via communication links 24 and 26, respectively. The equipment operator/owner terminals 50, 52 allow the operator/owner to access via an Internet portal the "real-time" equipment operation and maintenance history files generated by the system. The features that an operator/owner may access at the Internet portal are further described in section C of this specification.

Sensor inputs 302 are located on the crane 300 to monitor operating conditions in key components such as the slewing bearing, container ring bearing, winches, boom, etc. For example, in the context of the crane 300, the sensor inputs 302 might include: a swing angle sensor for measuring radial boom displacement; a boom angle sensor (i.e., an inclinometer) to measure boom incline displacements and boom angles; and a load sensor for measuring the strain in the backleg structure (knowing the crane geometry, the system converts the reading from the load sensor into an equivalent loading of the roller circle or slewing bearing). Similarly, sensor inputs 402 are located on the winch 400 to monitor operating conditions in key components such as the drum, drum bearings, levelwind, etc.

The sensor inputs 302, 402 communicate operating condition data to their respective sensor data links 304, 404. The sensor data links 304, 404 forward the operating condition data to the to the computer 40 via the communications management devices 110 in the computer 40 via the communication network 10. In one embodiment, the sensor data links 304, 404 use existing PLC's on the equipment and supplemental programming on the PLC's to gather data from the sensor inputs 302, 402. This data is formatted using XML or a similar standard then transmitted to or shared with a PC or other processor programmed and configured to use TCP/IP or other data transmission protocols to transmit data via the communication network 10 to computer 40. Thus, the equipment 300, 400 may be located remote from, even great distances away from, the computer 40. The applications 120 receive and store the incoming operating condition data in the operating conditions data files 210 in the database 200. The operating conditions data is then available for analysis, including further processing so that it may be compared to and utilized in the component wear models defined by the duty profiles 220, as explained in the following discussion directed to FIG. 2.

Figure 2:
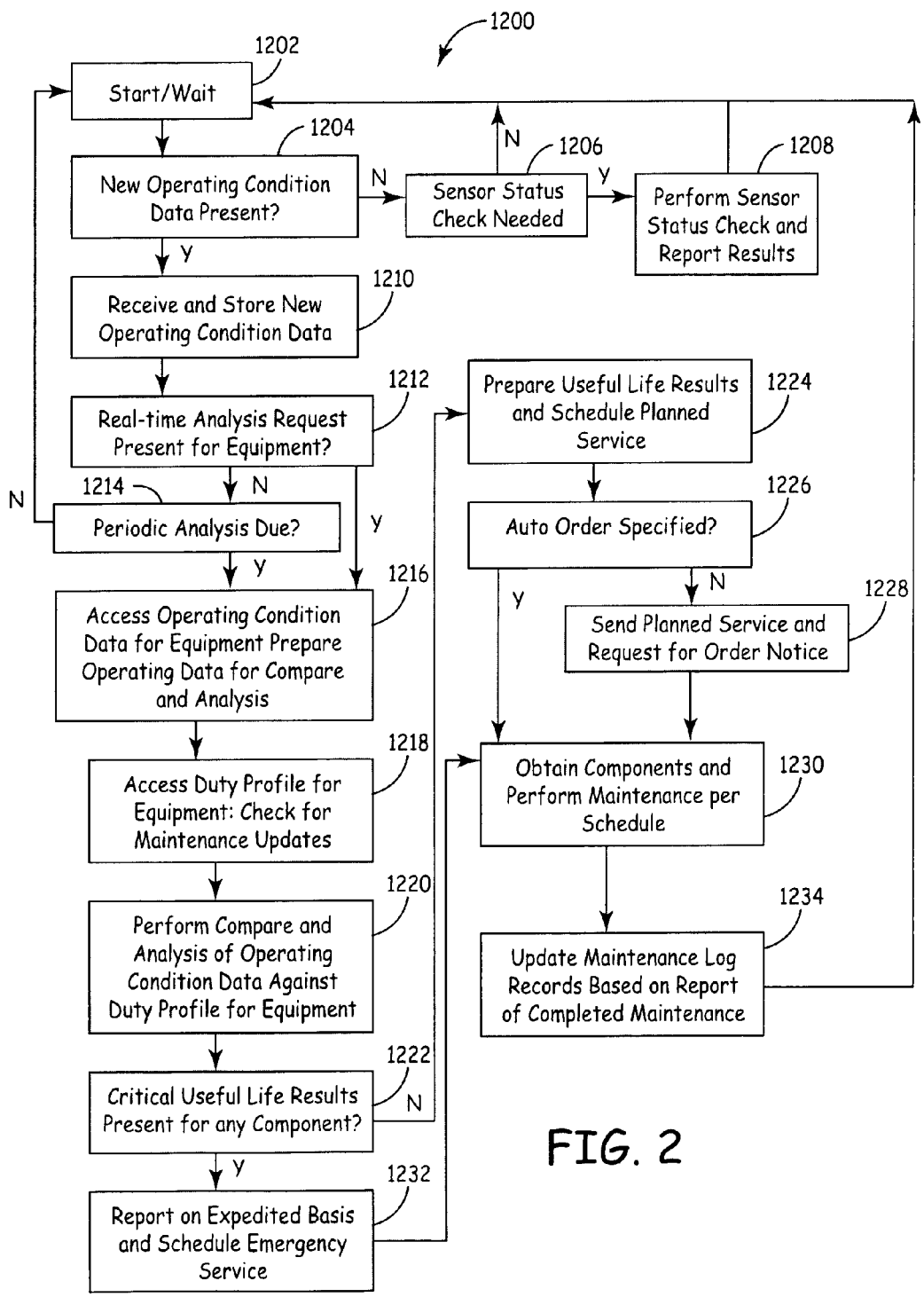
FIG. 2 is a flow chart showing the steps involved in using the system of FIG. 1 to produce a useful life analysis report and other maintenance recommendations.

FIG. 2 is a logic diagram illustrating the processes 1200 executed by the applications 120 with respect to the operating condition data and the duty profiles. Before the process can be executed, the relevant duty profiles 220 from the original design and any supporting data used to analyze component useful life under various operating conditions must be loaded. This data is coordinated with and used by the applications 120. As shown in FIG. 2, the process 1200 begins with a start/wait state 1202. When the process 1200 is initiated, it inquires whether new operating condition data is present 1204 (i.e., whether new operating condition data has been received from the sensor inputs 302, 402). If the new operating condition data is not present, then the process 1200 determines whether a sensor status check is needed 1206. This check is performed to determine whether or not the failure to receive new operating condition data is the result of a malfunctioning sensor. If a sensor status check is needed, then the process 1200 performs the sensor status check and reports the result 1208. The process then returns to the start/wait mode 1202.

If the process 1200 determines that there is new operating condition data present 1204, then the new operating condition data is received and stored 1210 in the system's database 200. The process 1200 then determines whether a real-time analysis request is present for the equipment 1212. If not, then the process 1200 determines whether a scheduled, periodic analysis is due 1214. If no periodic analysis is due, then the process 1200 returns to the start/wait mode 1202. If the periodic analysis is due (for example, the end of a defined monitoring period for a particular piece of equipment, such as a day, week, month etc., is present), then the process 1200 accesses the operating condition data for the particular item of equipment and prepares the operating data for comparison and analysis 1216.

If the process 1200 determines that a real-time analysis request is present for the equipment 1212, then the process 1200 proceeds directly to access the operating condition data for the equipment and prepares operating data for comparison and analysis 1216. The process 1200 then accesses the duty profile for the equipment and checks for maintenance updates 1218 that may have recently occurred and that may affect a duty profile analysis. The process 1200 then performs comparison and analysis of the operating condition data against the duty profile for the equipment 1220.

As described in section D of this specification, the duty profile is part of the initial design process and is used to select the original components and to develop a theoretical useful life for each key component under assumed operating usage cases and operating conditions. The duty profile and its assumed operating conditions, and the component useful life data that were assumptions in the original design, are revisited during comparison and analysis step 1220 to make adjustments to component useful life predictions and any corresponding maintenance plans, after some actual operating condition data has been gathered.

The process 1200 then determines whether critical useful life results are present for any component 1222 (i.e., whether any component has reached, or will soon reach (is within a critical range of), the end of its useful life and require maintenance or replacement immediately). If not, the process 1200 prepares useful life results and schedules planned service 1224. This includes preparing electronic and/or paper reports on operating conditions, useful life and recommended long and short term maintenance plans by component. A scheduled replacement need may be signaled when the amount of the theoretical useful life consumed is within a replacement range of the adjusted theoretical useful life. The process 1200 then determines whether auto order of any components is specified 1226. If auto order is not specified, the process 1200 sends a planned service and request for order notice 1228 to the equipment owner/operator and any parties involved in maintenance service. This prompts relevant personnel to place necessary component orders. If the auto order is specified, the process 1200 arranges for components to be obtained and shipped and for maintenance to be performed per a system-generated schedule 1230.

If the process 1200 determines that critical useful life results are present for a component 1222, then the process 1200 issues a report on an expedited basis (e.g., e-mail to terminals 50, 52; fax; messages back to sensor data links 304, 404) and schedules emergency service 1232 by contacts with maintenance service personnel and the equipment owner/operator. The process 1200 then arranges for components to be obtained and shipped and for maintenance to be performed per a system-generated schedule 1230. The process 1200 then updates the maintenance log records based on the report of completed maintenance 1234. The process 1200 then returns to the start/wait mode 1202.

Figure 3:
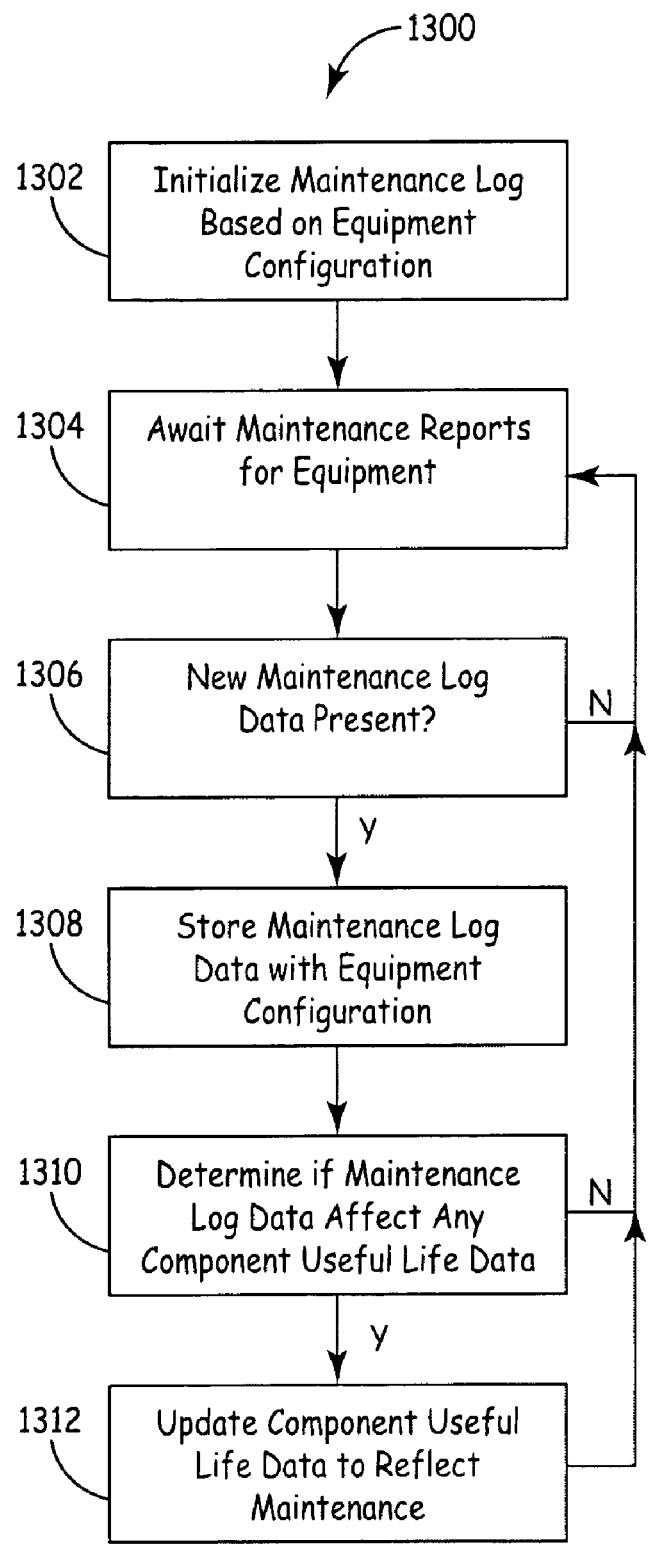
FIG. 3 is flow chart showing how the system of FIG. 1 is used to handle maintenance data.

FIG. 3 illustrates a process 1300 for entering maintenance information into the system. Maintenance can affect useful life computations when a replacement component is inserted into the analysis. This is because a new component has no past operating conditions as part of its history. Also, a new component may or may not have a different theoretical useful life under the assumed operating conditions.

The process 1300 initializes the maintenance log based on equipment configuration 1302. The process 1300 then awaits periodic or special maintenance reports for equipment 1304, e.g., input from terminals 50, 52 if maintenance is logged by the owner/operator or from terminal 30 if logged by operators of the system of FIG. 1.

The process 1300 next determines whether new maintenance log data is present 1306. If not, then the process 1300 continues to await maintenance reports for the equipment 1304. If new maintenance log data is present, then the process 1300 stores the maintenance log data with the referenced components in a particular equipment configuration for which maintenance has been performed 1308.

The process 1300 then determines if maintenance log data affects any component useful life data 1310. If no, then the process again awaits maintenance reports for the equipment 1304. If the maintenance log data does affect any component useful life data, then the process 1300 updates the component useful life data and any affected duty profiles to reflect the maintenance 1312, including possible changes in component useful life data files. The process 1300 then again awaits maintenance reports for the equipment 1304.

C. Features Accessible Via the Internet Portal

Figure 4A:
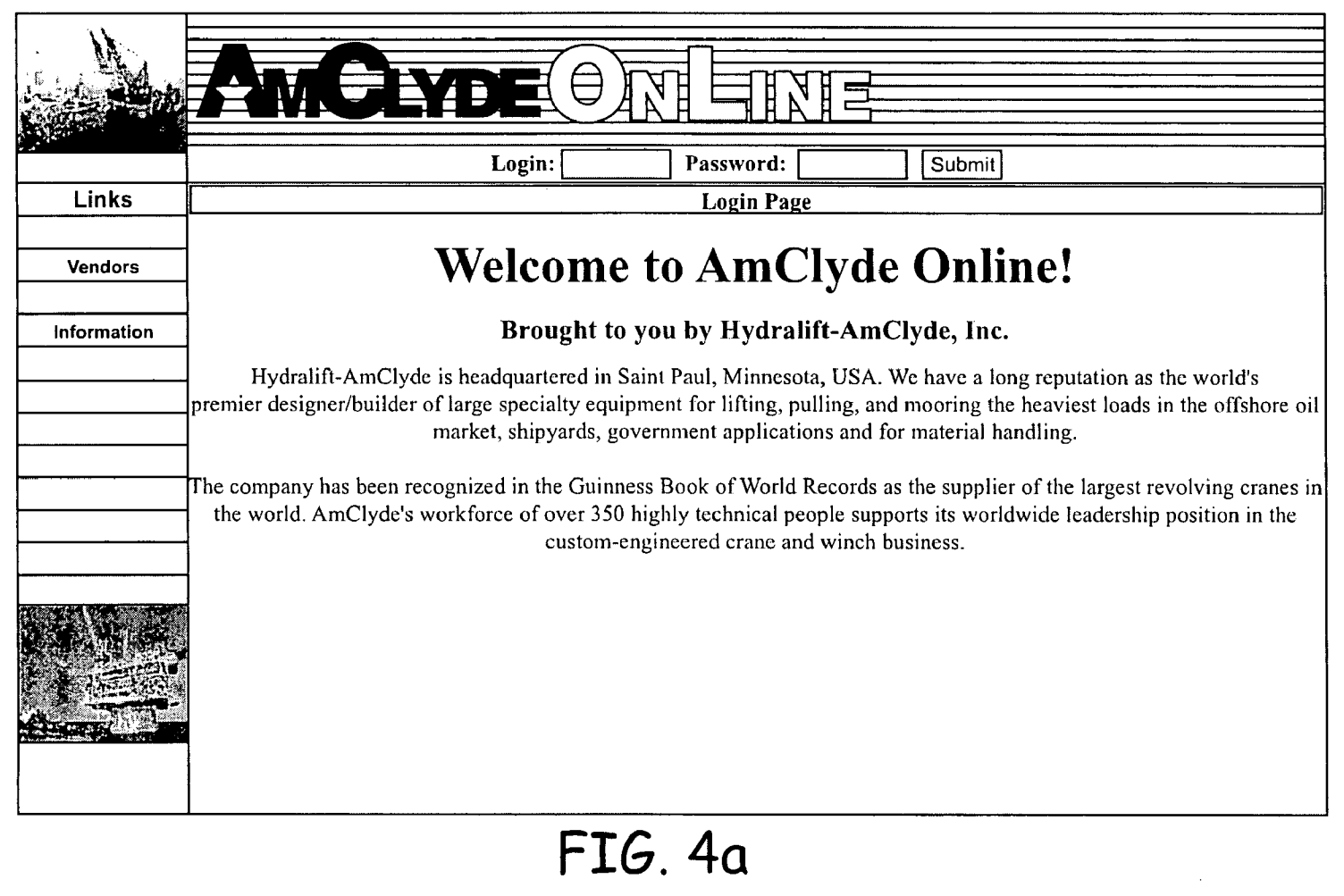

In one embodiment, the operator/owner, maintenance personnel, or service provider may access the system on-line via the Internet. In doing so, the person accessing the system enters an Internet portal (see FIG. 4a) that is designed in a modular format incorporating standard web-based protocol architecture. The internet portal provides access to modules pertaining to the equipment associated with the system. The modules are accessible via multiple navigation paths for any of the equipment associated with the system. In one embodiment, the modules include a maintenance module, a maintenance and parts manuals module, a data log module, a spare parts module, and an equipment location map module.

Figure 4B:
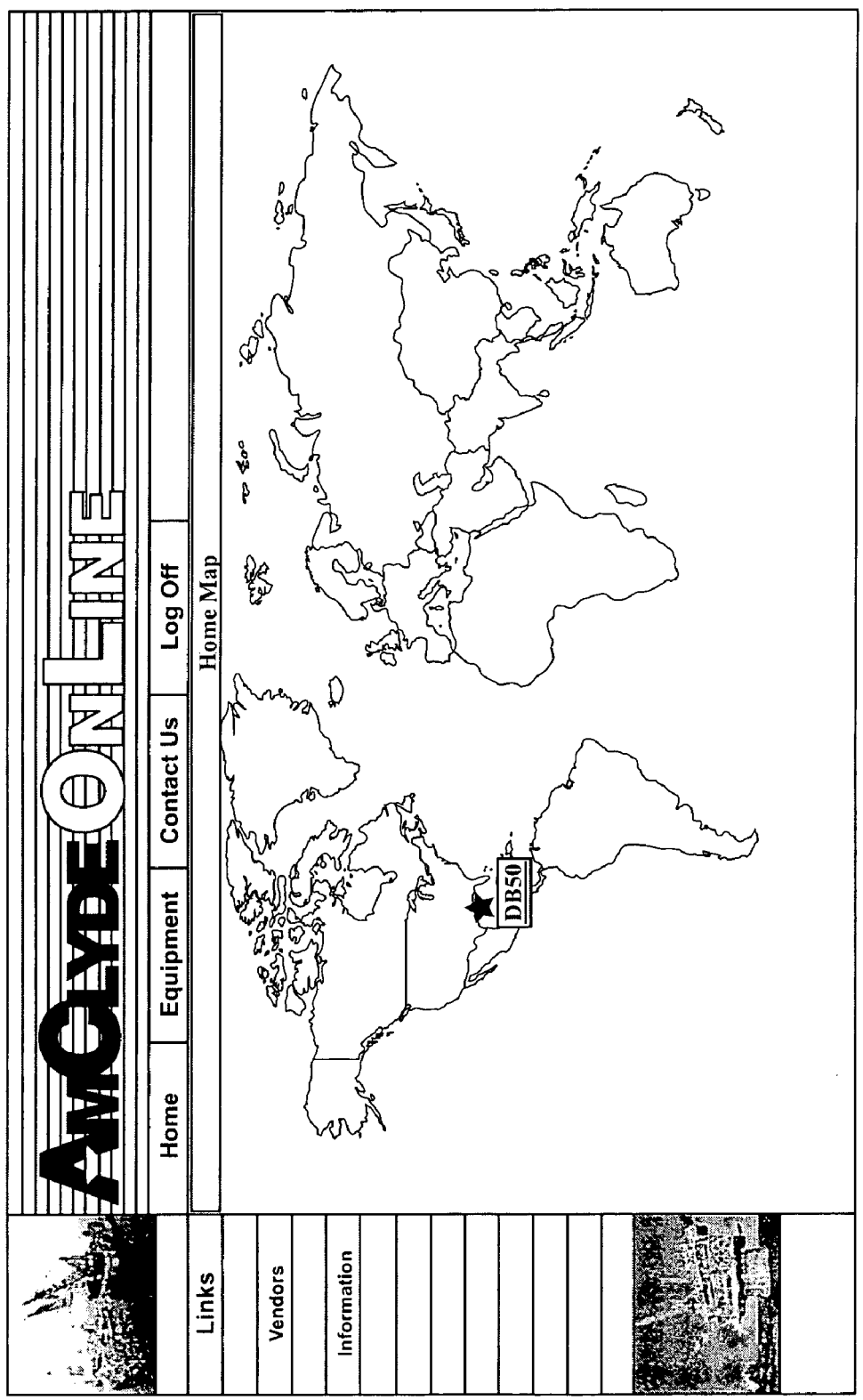
FIG. 4b is a representation of a screen display for an interactive map used in a computer system using the subject invention.

In one embodiment, the operator/owner will be able to access on-line an interactive map of the world or part of the world, as illustrated in FIG. 4b. The map will show the locations of the owner/operator's equipment that are under management by the system. Clicking on the desired location or equipment provides the owner/operator, based on the selections made, access to the modules and/or data for each piece of equipment. Alternatively, a customized, dynamically-created bar menu, based on each owner/operator's equipment list, is displayed across the top. Drop down menus bring the owner/operator directly to the modules for each piece of equipment. The system can be customized to meet each owner/operator's operations utilizing standard web site architecture.

The maintenance module is designed to provide easy access to maintenance records via the web portal. Each person (with Internet access) signing onto the system will have a unique password that will provide for varying levels of access. For example, an individual or individuals completing the actual maintenance of the equipment could have access only to the input data sheets for recording the inspection time and data. Their supervisor would have access to the next level reports illustrating maintenance history. Each level of access is controlled by the log-on password.

Each piece of equipment in the customer's inventory has a scheduled maintenance interval that is loaded into the system. The system provides for automatic notification of maintenance tasks that are due and their due date. The over-due or scheduled maintenance task screen shown in FIG. 4c illustrates the type of data that would be available for maintenance supervisor to efficiently schedule his maintenance assignments.

Once the maintenance is completed, the data is loaded into the system and is accessible on-line by any person with security access to this portion of the module. All maintenance records are kept up to date, allowing for "real-time" access and planning of preventive maintenance.

Figure 4D:
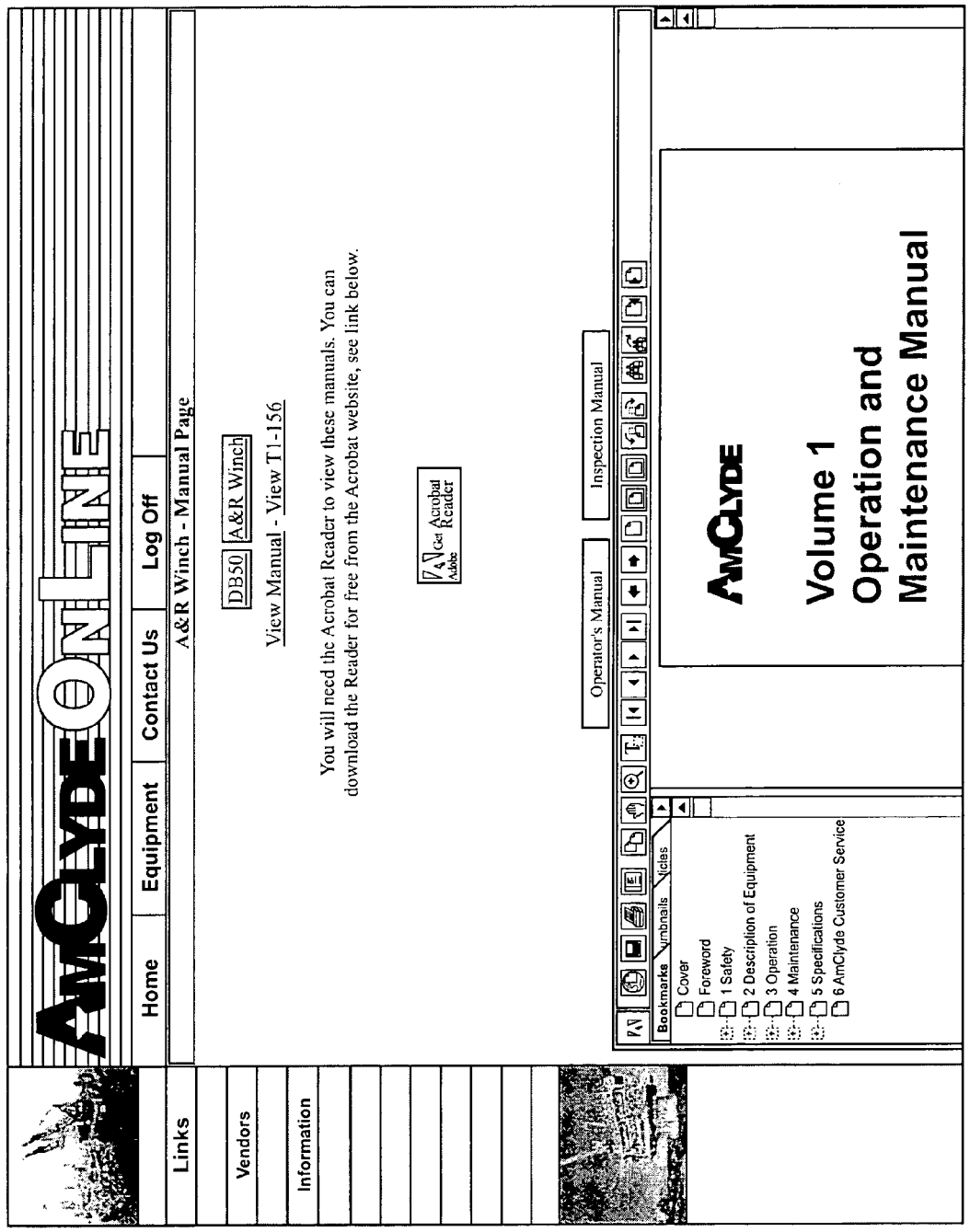
FIG. 4d is a representation of a screen display for a maintenance and parts manual module used in a computer system using the subject invention.

The maintenance and parts manual module provides "real-time" access to the latest updated documents. These manuals are updated periodically on the system and sent to a owner/operator's home office for distribution to the piece of equipment. The online access to manuals, as portrayed in FIG. 4d, provides the maintenance and operators instant access to updates to service modifications and safety features for the equipment under management by the system.

Figure 4E:
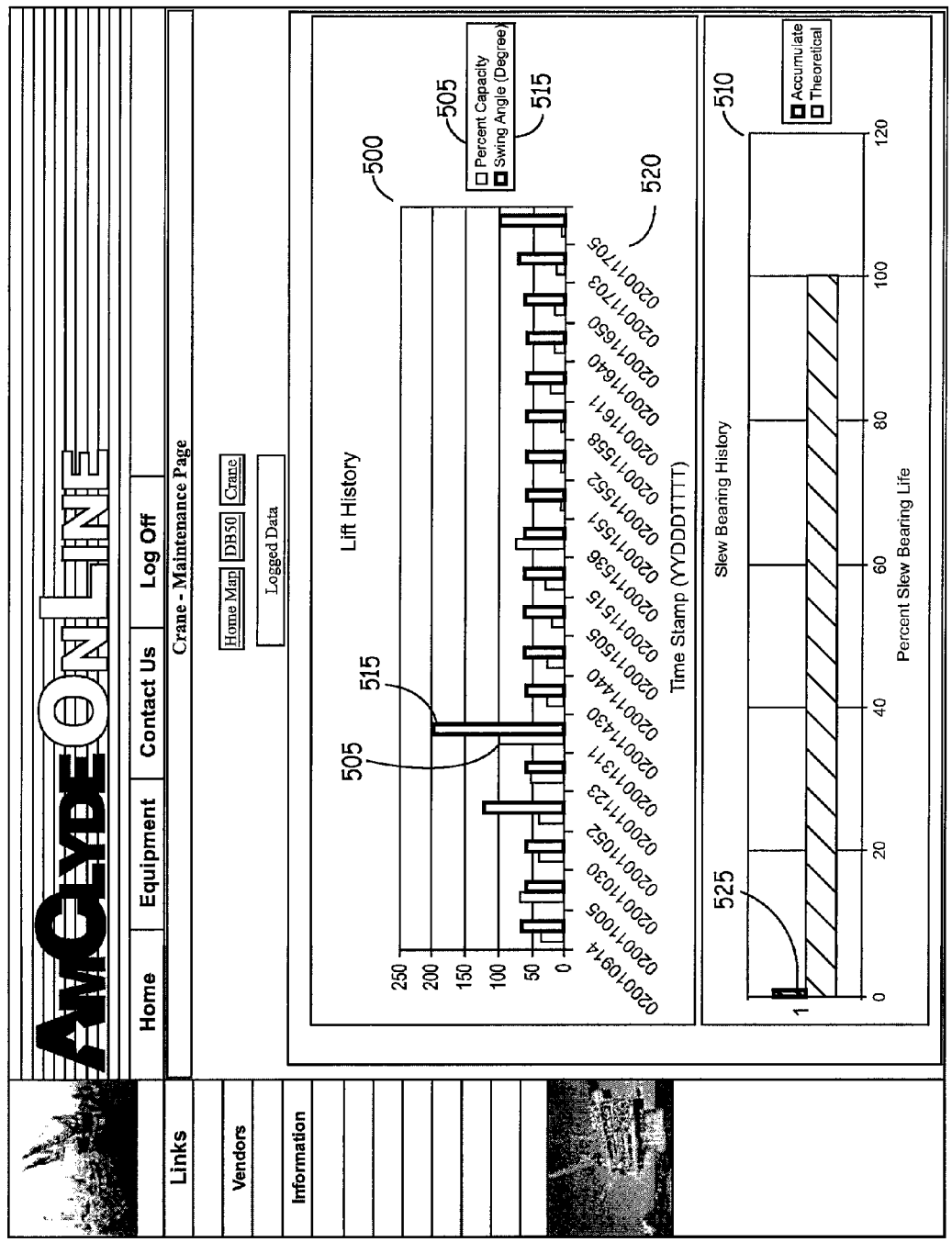
FIG. 4e is a representation of a screen display for a data acquisition module that shows operating data and useful life data and is used in a computer system using the subject invention.

The data acquisition module provides access to historical information detailing the actual loading or other operating conditions for each monitored component in the piece of equipment recorded over the life of the component. This recorded data is compared with theoretical design considerations (design profiles) and these comparisons are used to predict preventive maintenance schedules for the monitored component. As illustrated in FIG. 4e, the data log module can also use operating condition data to tabulate and sum the total throughput of an individual piece of equipment providing information for planning, production schedules, and maintenance schedules.

Figure 4F:
FIG. 4f is a representation of a screen display for a spare parts module used in a computer system using the subject invention.

The spare parts module provides for access to parts manuals and drawings. As indicated in FIG. 4f, the bill of material is available on-line along with the appropriate drawing listing. The component part can be identified on-line and inventory status, quotations and deliveries can be provided. The component can be ordered on-line.

D. Simplified Exemplary Theoretical and Actual Component Useful Life Calculations A highly simplified example of the process of calculating the theoretical and actual component useful life for individual components of equipment X (e.g., a crane, winch, loader, etc.) will now be given. While component wear is a function of multiple factors such as force, torque, displacement speed, acceleration, deceleration, temperature, corrosion, particles, surface treatment, lubrication, friction, etc., for the sake of understandability, component wear in the following example, is equated with the work (i.e., force or torque multiplied by displacement) done by the equipment.

In general terms, the process of the invention initially plans maintenance for equipment X based on assumed theoretical duty profiles, which are based on assumed operating conditions. As equipment X begins its operational life, operating condition data is collected by the system. The collected data is utilized to adjust the theoretical duty profiles of equipment X. The adjusted duty profiles are then used to adjust the maintenance schedule for the equipment. The adjusted duty profiles are also used to calculate the amount of equipment life exhausted up to that point in time. The adjusted duty profiles are also utilized to project the remaining expected equipment life.

As can be appreciated from the following example, actual operating conditions can shorten or lengthen the actual equipment and component useful life relative to the original assumed equipment and component useful life depending on whether the actual operating conditions are more or less harsh than originally assumed. As can be appreciated from the preceding FIGS. and discussion, and as will become more clear from the following discussion, the system and process of the subject invention allows the predicted equipment life and maintenance schedule to be automatically updated based on equipment X's real-time operational data. The simplified example is as follows.

FIG. 5 illustrates an exemplary, but highly simplified, Assumed Duty Profile analysis broken down by component for equipment X (e.g., a crane, windlass, loader, etc.). As shown in FIG. 5, equipment X has components A, B and C.

In calculating an assumed duty profile, an equipment designer first assumes an equipment design life for the equipment in question. For this example, the assumed equipment design life for equipment X is 25 years. The designer then assumes the types and numbers of operations (i.e., usage cases and their repetitions) equipment X will be subjected to during its assumed equipment design life. Each usage case is assumed to be a specific type of operation at a specific level of loading and displacement.

As indicated in FIG. 5, equipment X is assumed to perform three different usage cases (Usage Cases 1, 2 and 3) over the course of its assumed equipment design life. It is assumed that equipment X will perform N1 (e.g., 100) "Usage Case 1" operations, N2 (e.g., 50) "Usage Case 2" operations, and N3 (e.g., 125) "Usage Case 3" operations over the 25 year assumed equipment design life for equipment X.

For equipment X, Usage Case 1 causes Component A (e.g., rotating shaft) to rotate 10 radians at a torque of 100 ft.lbs., and Component B (e.g. a hydraulic ram) to displace 5 ft against a force of 10 lbs. Component C (e.g., a sheave) does not participate in Usage Case 1. Thus, each occurrence of Usage Case 1 subjects Component A to C1 (1,000) ft.lbs. of work, Component B to C2 (50) ft.lbs. of work, and Component C to C3 (no) ft.lbs. of work. Usage Case 1 is assumed to occur N1 (100) times over the course of the 25 year assumed equipment design life.

For equipment X, Usage Case 2 causes Component B to displace 10 ft against a force of 50 lbs, and Component C to rotate 20 radians at a torque of 50 ft.lbs. Component A does not participate in Usage Case 2. Thus, each occurrence of Usage Case 2 subjects Component B to C5 (500) ft.lbs. of work, Component C to C6 (1000) ft.lbs. of work, and Component A to C4 (no) ft.lbs. of work. Usage Case 2 is assumed to occur N2 (50) times over the course of the 25 year assumed equipment design life.

For equipment X, Usage Case 3 causes Component A to rotate 15 radians at a torque of 200 ft.lbs., Component B to displace 10 ft against a force of 200 lbs, and Component C to rotate 30 radians at a torque of 200 ft.lbs. Thus, each occurrence of Usage Case 3 subjects Component A to C7 (3,000) ft.lbs. of work, Component B to C8 (2,000) ft.lbs. of work, and Component C to C9 (6,000) ft.lbs. of work. Usage Case 3 is assumed to occur N3 (125) times over the course of the 25 year assumed equipment design life.

As shown in FIG. 5, the ft.lbs. of work per usage case for each component is multiplied by the number of occurrences of that usage case. These values are then added for each component to arrive at the component's Theoretical Component Usage Profile. For example, with respect to Component A's Theoretical Component Usage Profile ($TCUP_A$), the formula is $(N1 \times C1)+(N2 \times C4)+(N3 \times C7)=TCUP_A$, which results in value of 475,000 ft.lbs. of work. Thus, under the conditions of the assumed duty profile, Component A would need to be able to withstand the amount of wear/stress/strain corresponding to 475,000 ft.lbs. of work in order to have a component design profile that is equivalent to the assumed equipment design life of 25 years. Similarly, with respect to Component B's assumed Theoretical Component Usage Profile ($TCUP_B$), the formula is $(N1 \times C2)+(N2 \times C5)+(N3 \times C8)=TCUP_B$, which results in value of 280,000 ft.lbs. of work. Thus, under the conditions of the assumed duty profile, Component B would need to be able to withstand the amount of wear/stress/strain corresponding to 280,000 ft.lbs. of work in order to have a component design profile that is equivalent to the assumed equipment design life of 25 years. Finally, with respect to Component C's Theoretical Component Usage Profile ($TCUP_C$), the formula is $(N1 \times C3)+(N2 \times C6)+(N3 \times C9)=TCUP_C$, which results in value of 800,000 ft.lbs. of work. Thus, under the conditions of the assumed duty profile, Component C would need to be able to withstand the amount of wear/stress/strain corresponding to 800,000 ft.lbs. of work in order to have a component design profile that is equivalent to the assumed equipment design life of 25 years.

Once the Theoretical Component Usage Profiles are generated, they may be utilized in the selection of actual components. A component's Theoretical Component Usage Profile may also be utilized to initially schedule maintenance for that component.

Sometimes available components will have Wear/Stress/Strain Ratings or characteristics that will correspond to the appropriate Theoretical Component Usage Profile. In those circumstances, the Theoretical Component Life Under the Duty Profile will equal the assumed equipment design life. This situation is reflected in FIG. 5 for Component A. The entire Wear/Stress/Strain Ratings (WSSR) (i.e., 475,000 ft.lbs. of work) of the actual Component A may be utilized, if needed, over the Selected Design Life (i.e., the 25 year assumed equipment design life).

Sometimes it will not be possible to find a component that has the WSSR or characteristics that correspond to the appropriate Theoretical Component Usage Profile. The actual component selected may have WSSR or characteristics that are significantly less than or greater than the appropriate Theoretical Component Usage Profile. For example, in FIG. 5, the actual component selected for Component B was able to withstand the amount of wear/stress/strain corresponding to 392,000 ft.lbs. of work. Thus, Component B's Theoretical Component Life Under the Assumed Duty Profile would be 35 years. Also, since the WSSR for Component B is 392,000 ft.lbs., this entire capacity is available, if needed, over the Selected Design Lifetime (i.e., the 25 year assumed equipment design life).

As a converse example, in FIG. 5, the actual component selected for Component C was only able to withstand the amount of wear/stress/strain corresponding to 400,000 ft.lbs. of work. Thus, Component C's Theoretical Component Life Under the Assumed Duty Profile would be 12.5 years. To meet the requirements of the Selected Design Life (i.e., 25 years), two Component C's must be utilized in succession. Thus, the effective WSSR for the two Component C's is 800,000 ft.lbs., which is available, if needed, over the Selected Design Life.

FIG. 6 illustrates an exemplary, but highly simplified, Actual Duty Profile broken down by component for equipment X over an actual period of use. The actual period of use for this example will be the first 2 years equipment X is in operation.

In calculating an actual duty profile, force, torque and displacement readings are obtained from sensors associated with the individual components A, B and C (see FIGS. 1 and 2). As equipment X performs an operation (i.e., usage case), the corresponding force, torque and displacement readings are recorded.

As indicated in FIG. 6, equipment X has performed N1 (10) Usage Case 1 operations over the first two years of equipment X's operational life. However, the force, torque and displacement values for the actual Usage Case 1 operations have been different from those selected for the Assumed Duty Profile. For example, actual Usage Case 1 operations have caused Component A (e.g., rotating shaft) to rotate 10 radians at a torque of 200 ft.lbs., and Component B (e.g. a hydraulic ram) to displace 5 ft against a force of 5 lbs. Component C (e.g., a sheave) did not participate in Usage Case 1. Thus, each occurrence of Usage Case 1 subjects Component A to C1 (2,000) ft.lbs. of work, Component B to C2 (25) ft.lbs. of work, and Component C to C3 (no) ft.lbs. of work.

As shown in FIG. 6, equipment X has performed N2 (5) Usage Case 2 operations over the first two years of equipment X's operational life. However, the force, torque and displacement values for the actual Usage Case 2 operations have been different from those selected for the Assumed Duty Profile. For example, actual Usage Case 2 operations have caused Component B to displace 5 ft against a force of 25 lbs, and Component C to rotate 20 radians at a torque of 50 ft.lbs. Component A did not participate in Usage Case 2. Thus, each occurrence of Usage Case 2 subjects Component B to C5 (125) ft.lbs. of work, Component C to C6 (1000) ft.lbs. of work, and Component A to C4 (no) ft.lbs. of work.

As indicated in FIG. 6, equipment X has performed N3 (12) Usage Case 3 operations over the first two years of equipment X's operational life. However, the force, torque and displacement values for the actual Usage Case 3 operations have been different from those selected for the Assumed Duty Profile. For example, actual Usage Case 3 operations have caused Component A to rotate 25 radians at a torque of 400 ft.lbs., Component B to displace 5 ft against a force of 100 lbs, and Component C to rotate 30 radians at a torque of 200 ft.lbs. Thus, each occurrence of Usage Case 3 subjects Component A to C7 (10,000) ft.lbs. of work, Component B to C8 (500) ft.lbs. of work, and Component C to C9 (6,000) ft.lbs. of work.

As shown in FIG. 6, the actual ft.lbs. of work per usage case for each component is multiplied by the actual number of occurrences of that usage case to date (i.e., for this example, the actual number of occurrences of that usage case over the first two years equipment X is in operation). These values are then added for each component to arrive at the component's Actual Component Usage. For example, with respect to Component A's Actual Component Usage ($ACU_A$), the formula is (N1×C1)+(N2×C4)+(N3×C7)=$ACU_A$, which results in value of 140,000 ft.lbs. of work.

As indicated in FIG. 5, the WSSR of the actual Component A utilized in equipment X was equivalent to Component A's Theoretical Component Usage Profile (475,000 ft.lbs). Dividing the Actual Component Usage (140,000) by 475,000 shows that approximately 29.5 percent of Component A's useful life has been utilized. This analysis approach is reflected in FIGS. 4e and 7.

Figure 7A:
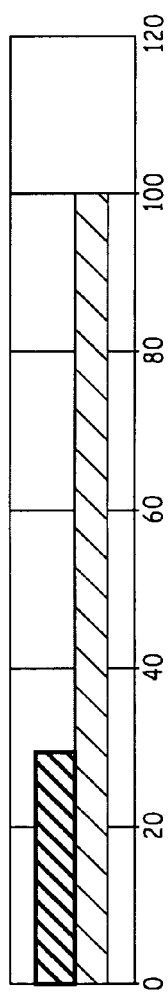
FIGS. 7a–7c are a graphical display comparing actual component usage versus a theoretical component usage profile.
Figure 7B:
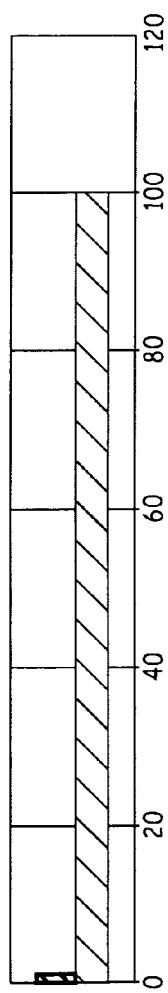
Figure 7C:
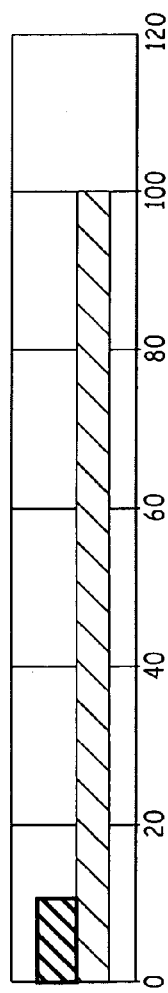

FIG. 4e is a computer screen display that shows the lift history 500 of a piece of equipment (e.g., a crane) and the remaining percent life of a component (e.g., slew bearing) of the equipment 510. FIGS. 7a–7c are is a graphical display (like that indicated by 510 in FIG. 4e) that graphically compares for each component the Actual Component Usage versus the WSSR for the actual component utilized.

As indicated in FIG. 4e, the lifting history 500 of the crane is recorded in terms of percent load capacity 505 and swing angle 515. These terms are recorded according to a time stamp 520. This information is utilized by the process of the invention to adjust in a real-time manner the usage profile for the slewing bearing. As the usage profile is adjusted, the percent of slewing bearing life exhausted 525 may be displayed as shown in graphical display 510.

Figure 8:
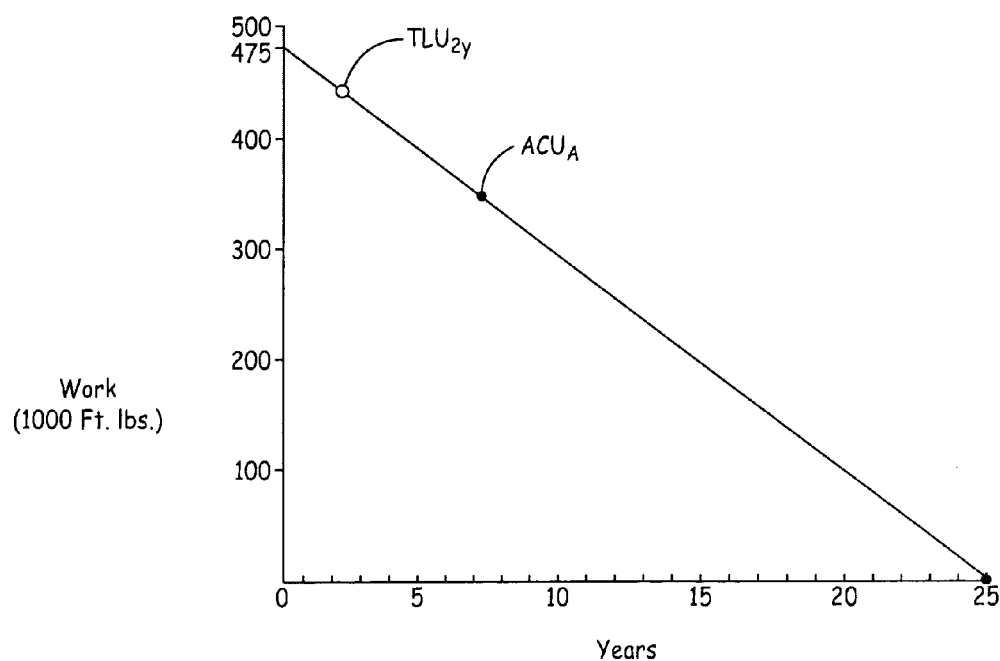
FIG. 8 is a graphical display of a component usage profile for a first component.

To compare the Actual Rate of Usage for Component A to the Theoretical Rate of Usage that should have occurred per the Assumed Duty Profile in the first two years of operation for equipment X, reference is now made to FIG. 8. FIG. 8 is a graphical representation of how the Actual Component Usage compares to the Assumed Usage Profile as applied to the WSSR for Component A.

As indicated in FIG. 6, the theoretical amount of component life that should have been utilized in the first two years of operation is calculated by the following formula: ($TCUP_A$/Selected Design Life)×actual years of use=Theoretical Life Used in Two Years ($TLU_{2y}$). For Component A, the $TLU_{2y}$ value is 38,000 ft.lbs and is represented on the Assumed Duty Profile curve of FIG. 8 by a circle. Since the two year Actual Component Usage is 140,000 ft.lbs., which is represented on the Duty Profile curve of FIG. 8 by a dot, it can be understood that Component A is being worn at a rate that is significantly higher than predicted by the Assumed Duty Profile. As reflected in FIG. 8, the Actual Component Usage is equivalent to approximately 7.4 years of use at the Assumed Duty Profile rate. Thus, if the actual usage remains constant over the years, Component A will require replacement in significantly less than 25 years.

As indicated in FIG. 6, the formula for Component B's Actual Component Usage ($ACU_B$) is (N1×C2)+(N2×C5)+(N3×C8)=$ACU_B$, which results in value of 6875 ft.lbs. of work. As indicated in FIG. 5, the WSSR of the actual Component B utilized in equipment X was 392,000 ft.lbs. This value exceeds Component B's Theoretical Component Usage Profile (280,000 ft.lbs). Consequently, the actual WSSR of 392,000 is utilized in the following computation because this capacity is available, if needed, over the selected design life of 25 years.

Dividing the Actual Component Usage (6875) by 392,000 shows that approximately 1.75 percent of Component B's useful life has been utilized. This is reflected in FIGS. 7a–7c, which graphically compares for each component the Actual Component Usage versus the WSSR for the actual component utilized.

Figure 9:
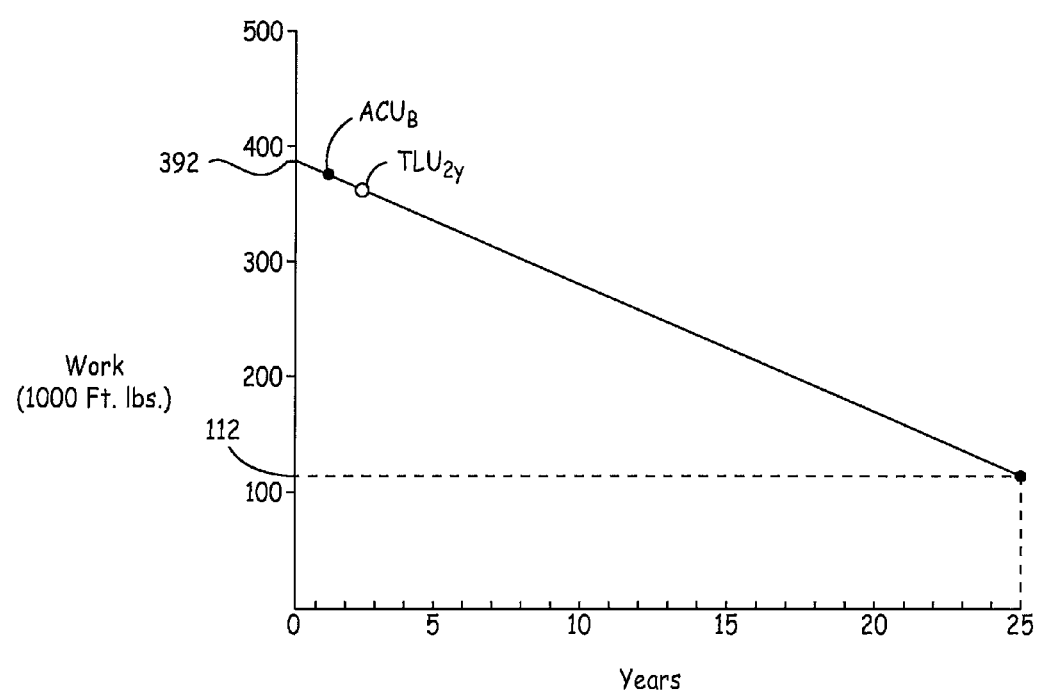
FIG. 9 is a graphical display of a component usage profile for a second component.

To compare the Actual Rate of Usage for Component B to the Theoretical Rate of Usage that should have occurred per the Assumed Duty Profile in the first two years of operation for equipment X, reference is now made to FIG. 9. FIG. 9 is a graphical representation of how the Actual Component Usage compares to the Assumed Usage Profile as applied to the WSSR for Component B.

As indicated in FIG. 6, the theoretical amount of component life that should have been utilized in the first two years of operation is calculated by the following formula: ($TCUP_B$/Selected Design Life)×actual years of use=Theoretical Life Used in Two Years ($TLU_{2y}$). For Component B, the $TLU_{2y}$ value is 22,400 ft.lbs and is represented on the Assumed Duty Profile curve of FIG. 9 by a circle. Since the two year Actual Component Usage is 6875 ft.lbs., which is represented on the Duty Profile curve of FIG. 9 by a dot, it can be understood that Component B is being worn at a rate that is significantly lower than predicted by the Assumed Duty Profile. As reflected in FIG. 9, the Actual Component Usage is equivalent to approximately 0.6 years of use at the Assumed Duty Profile rate. Thus, if the actual usage remains constant over the years, Component B will last significantly longer than 25 years.

Also, even if the Actual Component Usage were equivalent to the Assumed Usage Profile, as illustrated in FIG. 9, Component B would have approximately 112,000 ft.lbs. of capacity left at the end of the 25 year period because the actual Component B had a WSSR of 392,000 ft.lbs. while the theoretical usage profile for Component B only required 280,000 ft.lbs.

As indicated in FIG. 6, the formula for Component C's Actual Component Usage ($ACU_C$) is $(N1 \times C3)+(N2 \times C6)+(N3 \times C9)=ACU_C$, which results in value of 77,000 ft.lbs. of work. As indicated in FIG. 5, the WSSR of the actual Component C utilized in equipment X was 400,000 ft.lbs. This value is less than Component B's Theoretical Component Usage Profile (800,000 ft.lbs). Consequently, two Component C's must be utilized in succession to reach the selected design life of 25 years. Adding the WSSR's of the first and second Component C's results in an effective actual WSSR of 800,000. This effective WSSR is utilized in the following computation because this capacity is available, if needed, over the selected design life of 25 years.

Dividing the Actual Component Usage (77,000) by 800,000 shows that approximately 10 percent of the first and second Component Cs' useful life has been utilized. This is reflected in FIGS. 7a–7c, which graphically compares for each component the Actual Component Usage versus the WSSR for the actual component utilized.

Figure 10:
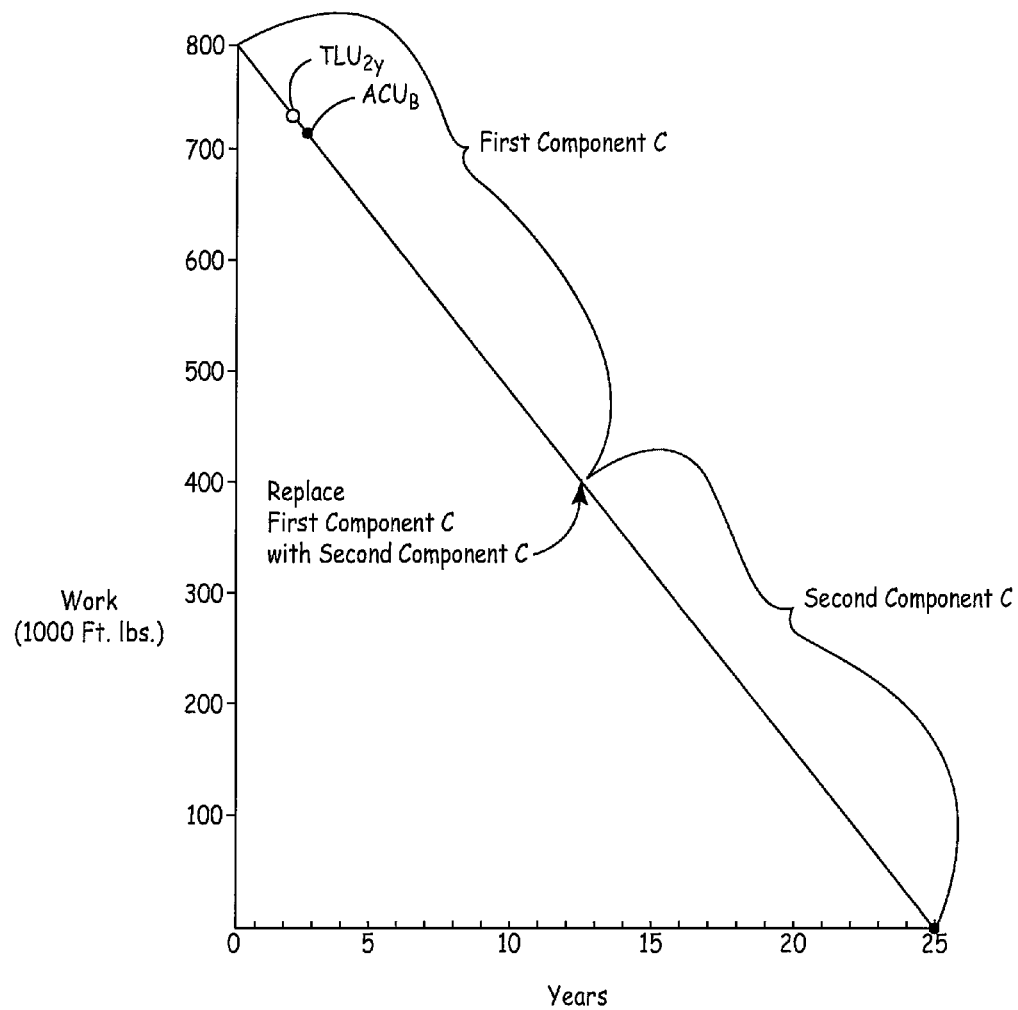
FIG. 10 is a graphical display of a component usage profile for a third component, which is planned for replacement.

To compare the Actual Rate of Usage for Component C to the Theoretical Rate of Usage that should have occurred per the Assumed Duty Profile in the first two years of operation for equipment X, reference is now made to FIG. 10. FIG. 10 is a graphical representation of how the Actual Component Usage compares to the Assumed Usage Profile as applied to the WSSR for Component C.

As indicated in FIG. 6, the theoretical amount of component life that should have been utilized in the first two years of operation is calculated by the following formula: ($TCUP_C$/Selected Design Life)×actual years of use=Theoretical Life Used in Two Years ($TLU_{2y}$). For Component C, the $TLU_{2y}$ value is 64,000 ft.lbs and is represented on the Assumed Duty Profile curve of FIG. 10 by a circle. Since the two year Actual Component Usage is 77,000 ft.lbs., which is represented on the Duty Profile curve of FIG. 10 by a dot, it can be understood that Component C is being worn at a rate that is higher than predicted by the Assumed Duty Profile. As reflected in FIG. 10, the Actual Component Usage is equivalent to approximately 2.4 years of use at the Assumed Duty Profile rate. Thus, if the actual usage remains constant over the years, it will require more than two Component C's to last 25 years.

In sum, the preceding duty profile analysis, which uses assumed or theoretical operating conditions and available data on component useful life under these operating conditions, is used to select components and make an initial theoretical maintenance and component replacement plan. The plan is placed on the system and as actual operating conditions are sensed and reported, the duty profile models used for the initial design and the initial theoretical maintenance and component replacement plan are used to update the plan and to recognize conditions that require component maintenance. The updating can be done either in real time as each set of operating conditions data is reported or periodically after data has been collected for a specified interval.

Figure 11:
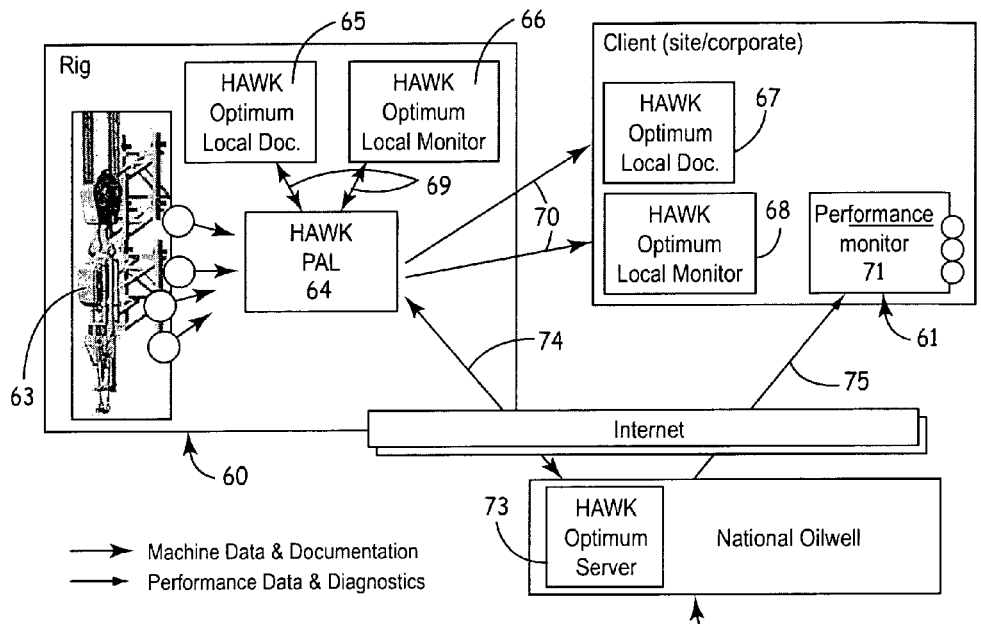
FIG. 11 is a schematic block diagram of another embodiment of the system of the present invention.

FIG. 11 shows another embodiment of the present invention. It is similar to the embodiment of FIG. 1 in some aspects, but differs in other. For the sake of completeness the embodiment of FIG. 11 will be fully explained, even the features that are similar to the embodiment of FIG. 1.

In FIG. 11 the area 60 denotes the elements that are situated on-site, i.e., on or close to the equipment being monitored. The area 61 denotes the client computer site, e.g., headquarters of the company using the equipment. The area 62 denotes the computer site of the service provider. The service provider may be the same company that has supplied the computer system and the equipment.

At the on-site area 60 is found the monitored equipment 63 that in this example is a top-drive and in a further example below a mud-pump, but may be any type of equipment feasible for monitoring. Moreover, in area 60 are found a computer 64 and two user interfaces 65 and 66. The user interface 65 contains documentation on the equipment 63. This may be technical specifications, manuals, certificates, etc. The user interface 66 provides on-site monitoring of the equipment 63, and allows the operator to monitor the performance and state of the equipment and associated sensors both current and historic. The interfaces 65 and 66 are in communication with the on-site computer 64 via an on-site or local area network, denoted by 69. The user interfaces 65 and 66 can be accessed and viewed on any browser connected to the network.

At the client computer site 61 there is also a documentation user interface 67 and a monitor interface 68. These give access to essentially the same information as the interfaces 65 and 66. The interfaces 67 and 68 are in communication with the on-site computer 64 via a network 70, which may be a corporate network, the Internet or a dedicated link.

At the client computer site 61 there is also a user interface 71 for performance monitoring that will be explained further in the following.

At the service provider area 62 is a server 73 (one or more may be present, depending on need). This server 73 is linked to the on-site computer 64 via the Internet, dedicated link 74 or other communication path. The server 73 collects performance (usage) data on the equipment 63 from the on-site computer 64. The server 73 also collects performance data on other pieces of similar equipment that may be present on other sites (not shown). On the basis of these collected data, the server 73 prepares aggregated and analyzed information on the specific type of equipment. This information is made available to the client through the performance monitor user interface 71 through a link 75. The link 75 may be the Internet, a dedicated link or other communication path.

The communication through the links 70, 74 and 75 may be through cable, any wireless communication system, via satellite or other communication path. If the Internet is used as a link, the only requirement is that the on-site computer, the client site and the service provider site are connectable to the Internet.

On the equipment 63 are situated various sensors 76. These perform measurements on the equipment 63 and present these to the on-site computer 64. Preferably the on-site computer 64 is a dedicated computer for the equipment 63 and may be physically attached to the equipment 63, so that it will follow the equipment if the equipment is moved to another site. Consequently, the on-site computer 64 may also be called an equipment computer. Computer 64 is configured to monitor more than one item of equipment, preferably several completely different types.

Figure 12:
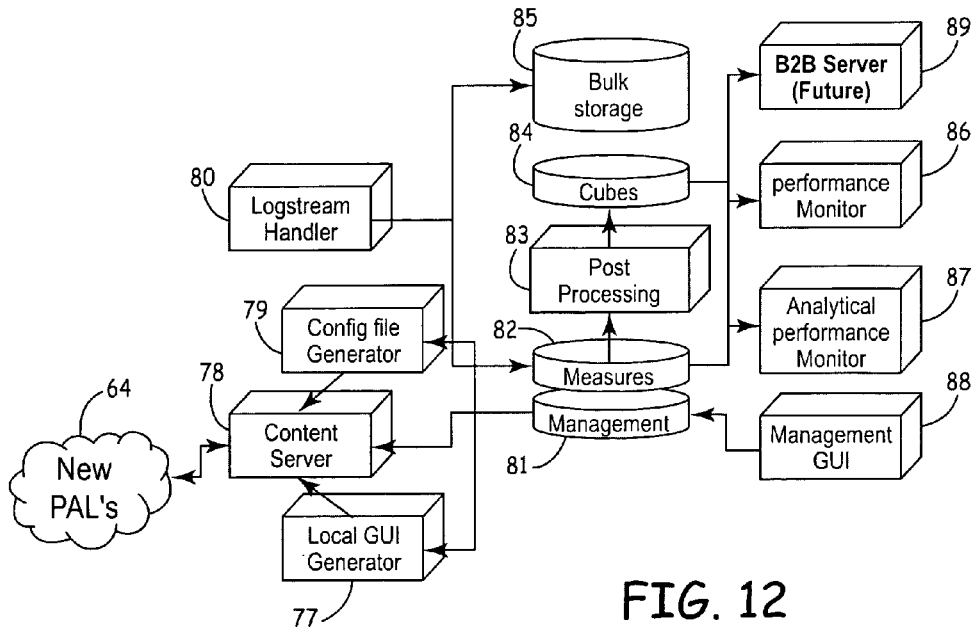
FIG. 12 is a data flow diagram showing certain data processing components of the on-site-computer of the system of FIG. 11.
Figure 13:
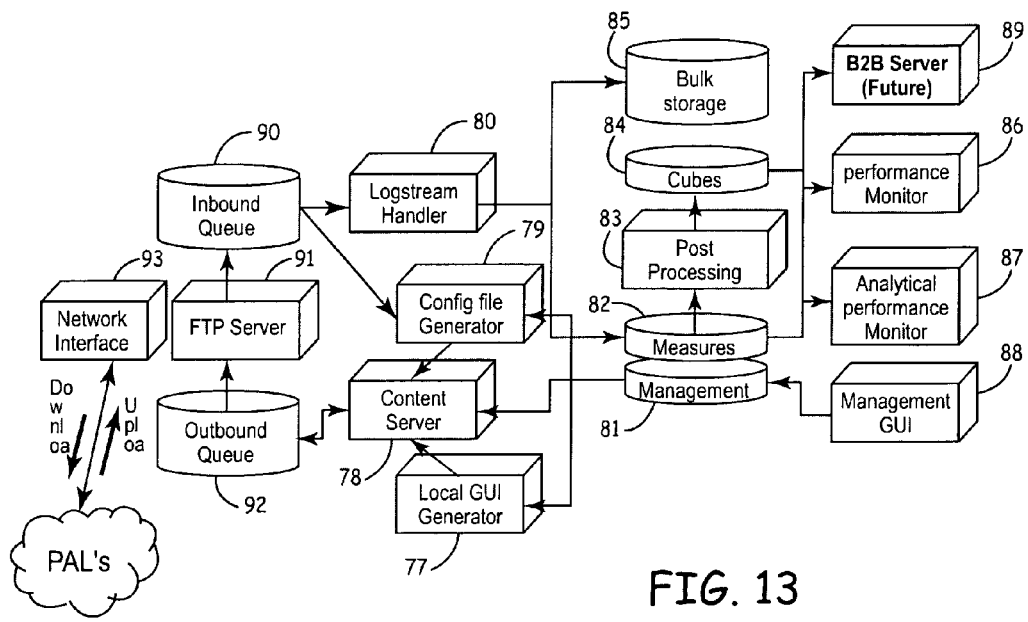
FIG. 13 is a another data flow diagram showing certain data processing components of the system of FIG. 11.

FIGS. 12 and 13 show a more detailed presentation of the monitoring system according to the embodiment of FIG. 11. In FIG. 12 some of the elements have been removed in comparison with FIG. 13 and vice versa, to facilitate the explanation of some of the aspects.

FIG. 12 shows how a new on-site computer 64, and hence a new piece of equipment 63, is coupled to the monitoring system and the set up of the on-site computer. The service provider server 73 is here divided into a number of elements 77–85. These will be explained in the following.

At the service provider site is also a performance monitor component 86, which is a user interface similar to the performance monitor 71 at the client site. There is also an analytical performance monitor component 87, which is another user interface that will be explained in more detail later. Finally, there is the database management GUI (graphic user interface) 88. In addition there may as an option be a business-to-business server 89 present at the service provider, serving as an interface to other client computer systems.

The management database GUI 88 provides access to a database that contains detailed information on all the equipment that may be connected to the monitoring system, including user interface information. During set-up a management database component 81 receives information on the specific type of equipment that is to be connected. The management database component 81 then defines how the raw measurements will be treated so that the presentation of the values is convenient for further processing and analysis and for presentation on the user interface. These definitions may be, e.g., the time span between each storage of measurements, smoothing of measurements, etc. The management database 81 also contains the correspondence between a value sensed on equipment and the parameter to which the value belongs.

The management database 81 provides these definitions to a configuration file generator 79, a content server 78 and a local graphic user interface generator 77. The configuration file generator 79 generates a configuration file for the on-site computer 64 and the local graphic user interface generator 77 generates a local interface. All this information is fed through the content server and transmitted to the on-site computer 64.

Every time an update is made a new configuration file and/or a new graphic user interface is generated and transferred to the on-site computer in the above described way. This provides a single point for configuration of the on-site computer. The configuration can be made directly between the service provider and the on-site computer. The initial configuration contains the following elements:

selecting equipment to monitor
selecting computer type for data acquisition
select and configure signals and parameters for the data logger in the on-site computer
select and configure calculations, filters and logging frequency for the data logger in the on-site computer
select and configure communication route
edit corporate knowledge to be applied on the central server
define and set up company, plant and user accounts Based on the input, the management database 81 will be the source from which to produce:

an XML configuration file to automatically set up all aspects of the data logger in the on-site computer by the configuration server 79
an XML configuration file to automatically set up the local monitor service via the interface 66 by the local GUI generator 77
an XML configuration file to automatically set up the local monitor content by the content server 78
automatic configuration and set up of database tables in the cubes 84
automatic configuration of the logstream handler 80

The transmittal of the configuration file and the graphic user interface setup will conveniently be done via the Internet, but it is also possible to do it by shipment of a CD-ROM or other type of data storage medium.

Figure 14:
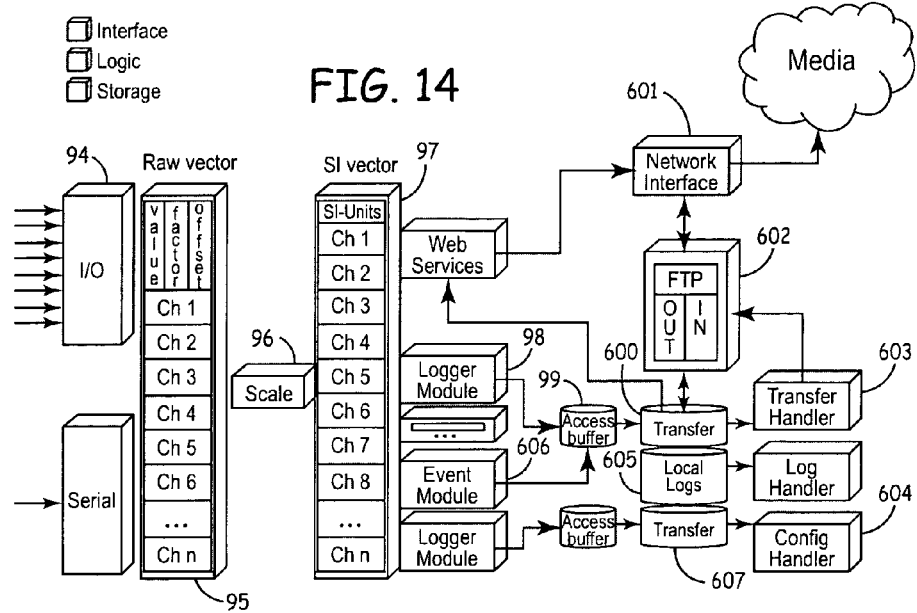
FIG. 14 is a further data flow diagram showing certain data processing components of the on-site-computer of the system of FIG. 11.

FIG. 14 shows a general overview of the on-site computer 64. The configuration file etc. is received through a network interface 601 and transferred through an input/output device 602 and final storage in a configuration database 607. The configuration handler will upon updating of its database 607 update all configurable parameters accordingly (for example parameters in elements 96, 97, 98 in FIG. 14).

Referring to FIG. 13, the data flow during the monitoring of the equipment will be explained. In addition to the elements shown in FIG. 12, FIG. 13 also shows an outbound queue 92 and an inbound queue 90 as well as an FTP (file transfer protocol) server 91 and a network interface 93.

The measurement data from the on-site computer 64 is received through the network interface 93 by the FTP server 91. The data is put in the inbound queue 90. The logstream handler 80 is configured to get data from the inbound queue 90 at regular intervals. In the logstream handler 80 the data are arranged so that these are presented in an order that will enable temporary storage in the measurement database 82. The function of the logstream handler 80 will be explained in more detail below.

A copy of the data transmitted to the measurement database 82 is also stored in the bulk storage 85. The purpose of this is, firstly, for backup and, secondly, to enable additional processing of data at a later stage if new methods for making equipment evaluation calculations are developed.

The measurement data is post processed in the postprocessor 83, involving calculation of certain calculated values (some examples of these will be presented below). After this selected measurement data and calculated data will be stored in the cubes database 84. The distinction between measurement data and calculated data is somewhat arbitrary, because calculations can occur at the equipment or at more central processors. Measurement data comes from the on-site (equipment) computer and is denominated raw, but it may be the result of calculations, filtering or other processing that occurs at the on-site computer. Such processing may also be done by intelligent sensors or controllers. Calculated data is what results after the measurement data are received and the particular algorithms are applied that produce from measurement data the desired calculated data useful in determining how component wear has progressed.

The performance monitor 86 and the analytical performance monitor 87 get data partly from the measurement database 82 (for tabular lists and reports) and partly from the cubes database 84 (for trend analyses, historic overview, etc.). The purpose of the performance monitor 86 is to make and present simple analyses to the person or persons monitoring the equipment, while the analytical monitor 87 presents more sophisticated analyses or freeform analyses. The simple analyses may be presented to an operator who needs to make quick decisions, while the more sophisticated analyses may be presented to a person who is making more strategic decisions. It is also conceivable to use one interface only for both simple and sophisticated analyses.

The acquiring of the measurement data will now be explained referring to FIG. 14, which show schematically the basic elements and components of the on-site computer 64.

The signals from sensors 76 (FIG. 11) are coupled to the input/output interface 94. Each of the sensors has its own channel 95 and the measurement data is stored in a temporary storage 97 after scaling 96 (to make the value consistent with the specified measurement units).

A logger module 98 gets the data from the temporary storage. The logger module 98 transfers these data via an access buffer 99 to a transfer storage 600. To perform this correctly, the logger module 98 has been updated from the configuration handler 604 on how to handle the different pieces of data. From the transfer storage 600 the data is transmitted to a network interface 601 via an FTP input/output device 602 by the aid of a transfer handler 603. This data is subsequently received at the network interface 93 at the service provider (FIG. 13).

If a certain measurement received at 94 needs to be handled in a different way, the applicable configuration file will be updated and sent to storage with the configuration handler 604 in the way described above. The configuration handler 604 will then tell the logger module 98 how to handle the measurement, so that after the update the server 73 will receive the measurement information as requested. The update may, for instance, be to log a certain measurement at longer or shorter intervals. Since the configuration file is stored on-site, the system is not dependent on being online for the measurements to be handled in the desired way.

A local log storage 605 also exists. This enables local storage of data in the event of a break in the link between the on-site computer 64 and the server 73. In some cases it may prove difficult to obtain an online connection between the on-site computer 64 and the server 73. In this case the data may be transferred regularly to a storage medium, e.g., a removable memory that can be connected to the computer via a USB port (USB memory). The storage medium may even be shipped to the service provider by ordinary mail or other physical delivery.

The on-site computer 64 also comprises an event module 606 that detects malfunctions in the measurement equipment (sensors, sensor wiring, etc.) and measurements that are out of the normal range of the equipment. These events are also transferred to the transfer storage 600 and hence to the server 73.

The handling of data in the service provider server 73 will be explained further referring to FIG. 15. The raw data that is in the inbound queue 90 (FIG. 13) is represented by reference number 620. The logstream handler 80 (FIG. 13) will parse the raw data 620, as denoted by reference number 621. The parsing particularly involves identifying the individual values in a data stream and assigning the correct identification to the values. After this the logstream handler 80 fills in "inherited" values, denoted by reference number 622. In order to reduce the amount of data that has to be transferred from the on-site computer 64 to the server 73, the on-site computer 64 will not send values if a measured value remains unchanged, e.g., if the top-drive 63 is lifting a load, the value of the first measurement of the load weight will be sent. (This can be effected with a filter that causes negligible changes in signals to be classified as unchanged.) After this no further values will be sent until the load weight changes, e.g., when the load reaches the drill floor. In 622 the "missing values" are filled in, so that the same value is repeated at regular intervals for the time the load was constant. This reduces the stream of data and hence the required bandwidth substantially.

After this the prepared data is transferred to the post processor 83, which calculates values based on the measured values, denoted by reference number 623. Examples of calculated values will be given below. Lookups in the management database determine the storage of values in the measurement database 81 and their post processing method into the multi-dimensional information cubes.

The post processor 83 may also identify out of limit values, denoted by reference number 624. The out of limit values may. for example, be excess load, excess running hours, out of range pressures or temperatures, etc., which signal problems or excessive consumption of useful life of a component. After the post processing the measures, values and identification are entered into a database consisting of a number of multidimensional "cubes." Multidimensional cubes have gained increased popularity as a means for storing large amount of data that has to be readily accessible. The multidimensional cubes can be seen as multidimensional matrixes in which each parameter is listed along one dimension, one dimension for each parameter. This way of storing the data provides the opportunity to quickly display tables and graphs showing the relationship between any of the parameters, even if the amount of data is very large.

Data in the multidimensional cubes has some main characteristics:

the data is pre-aggregated to obtain high performance in searches and retrievals, or otherwise to facilitate datamining by tools such as neural networks the data is arranged along predefined axes to enable and simplify X-Y charts (e.g., view distribution of temperatures over different pressures)

the data is optimized for searches across large number of similar type of equipment In addition, the multidimensional cubes enable storage of all data collected over the full lifetime for large number of equipment units.

As a result, this enables a new way of consolidating lifetime data as a platform for empirical investigation and data mining to be fed back into the design process or service procedures. Information about how and when maintenance was executed is stored in the same database, and correlated in time.

The multidimensional cubes are in this particular example three separate cubes. The first, denoted by reference number 625, contains all measurements, including most of the calculated parameters. The second, denoted by reference number 626 contains the calculated parameters critical to the lifetime surveillance, like the load weighted running hours, for monitoring the operation of the equipment. The third cube, denoted by reference number 627, contains the out of limit measures. If there have been no occurrences of out of limit values, this cube is empty.

The monitoring of the equipment will now be explained in more detail, referring to examples of parameters and charts.

FIG. 16 shows a table of typical parameters to be measured and logged for a piece of equipment, in this example a mud pump, as well as the measurement units applicable for each parameter. The table shows various pressures, temperatures, flows, running hours, fault codes (if applicable), etc.

FIG. 17 shows in the upper part some constants that are used in the calculations of calculated parameters and in the lower part a table of typical calculated parameters for a mud pump. The first column shows the constant or parameter text, the second column shows the constant or parameter name in the computer system, the third column shows the unit for the constant or parameter and the fourth column shows for the value of the constants or the formula used to calculate the parameter. In the upper right hand corner is a frame listing definitions of some of the variables, i.e., measured parameters received as raw data measurement inputs for the calculated wear parameters.

One of the more important calculated wear parameters for certain types of equipment is the accumulated, load weighted running hours, which is listed at the bottom of FIG. 17. This is calculated according to the following formula:

$$T\_hrw+f*w*delta-t/3600$$

where delta-t/3600 is the time in seconds since the last logging of accumulated load weighted running hours in seconds divided by seconds per hour.

w is a load factor according to the following formula:

$$(2*p\_disch/p\_rated)\char`\^e*(2*S\_pump/S\_rated),$$

where p_disch is the current discharge pressure from the pump measured, p_rated is a constant denoting rated pressure, which has the value 517.1 bar, S_pump is the current pump speed and S_rated is a constant denoting rated pump speed, which has the value 212 strokes per minute.

r is a binary factor that has the value zero or one, according to the following formula:

$$\text{If } (S\_pump<0.02*S\_rated;0; 1$$

where S_pump is the pump speed and S_rated is the rated pump speed, as given above. Consequently, r is zero if the current pump speed is less than 2% of 212 strokes per minute and one if the current pump speed is equal to or greater than this.

T_hrw is the previously logged accumulated load weighted running hours.

All the other calculated factors are also calculated based on measured parameters or constants specified at the server 73.

FIG. 18 shows a table containing the limits for some critical parameters used at step 624 of FIG. 15. The first column shows the ID number for the limit, the second column shows the parameter limit name, the third column shows the logical operator to be used and the fourth column shows the limit value. If any of these parameters fall outside the limit set, an out of limit value will be entered into the out of limit cube 627.

For certain types of equipment it is of vital significance to have 2-dimensional limit values. This is the case with, e.g., a crane. The crane may have different lifting capacity depending on the angular position of the boom in both the horizontal and the vertical plane. In this case the performance limits will be different depending on the boom position. The crane may have a high lifting capacity over a certain sector in the horizontal plane. In another sector in the horizontal plane, it may be prohibited to use the crane only with empty hook (for transit only) or with a smaller load. The load limit in the same sector may also depend on the boom angle. Consequently, if the boom passes into a sector with an excess load, an out of limit event can be detected based on the 2-dimensional limit values. The operator may get a message telling him how to return within one of the limits where the sensed value is within his control or that the operation must cease; e.g., instructed that if he raises the boom to a steeper angle, he may pass through the sector with this load, or that it is not possible to pass this sector.

The 2-dimensional performance limits can be implemented in the system as a 2-dimensional table, such as FIG. 26, which is convenient to store in multidimensional cubes. For some equipment more than 2-dimensions might be used to define the design envelope for safe or appropriate operation. Thus, the 2-dimensional performance limits can be extended to N-dimensional performance limits.

Figure 19:
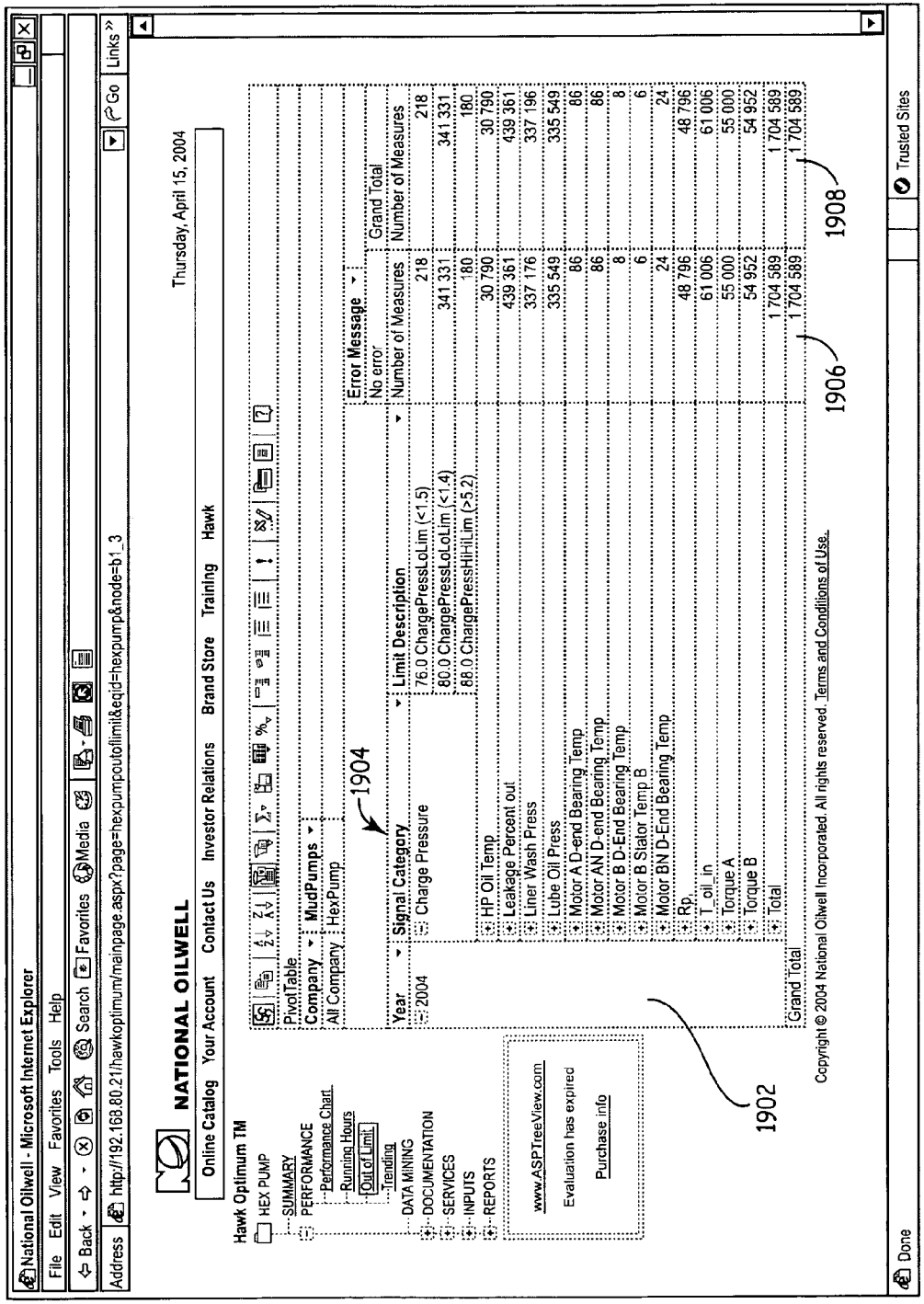
FIG. 19 shows a screen print containing a table with measurements made for a mud pump.

FIG. 19 shows a screen print containing a table with measurements made on a mud pump. The first column 1902 shows the year, the second column 1904 shows the parameters measured, with a limit description on some of the parameters (this corresponds to some of the limits shown in FIG. 18). Third and fourth columns 1906, 1908 show the number of measurements taken for each of the parameters.

Figure 20:
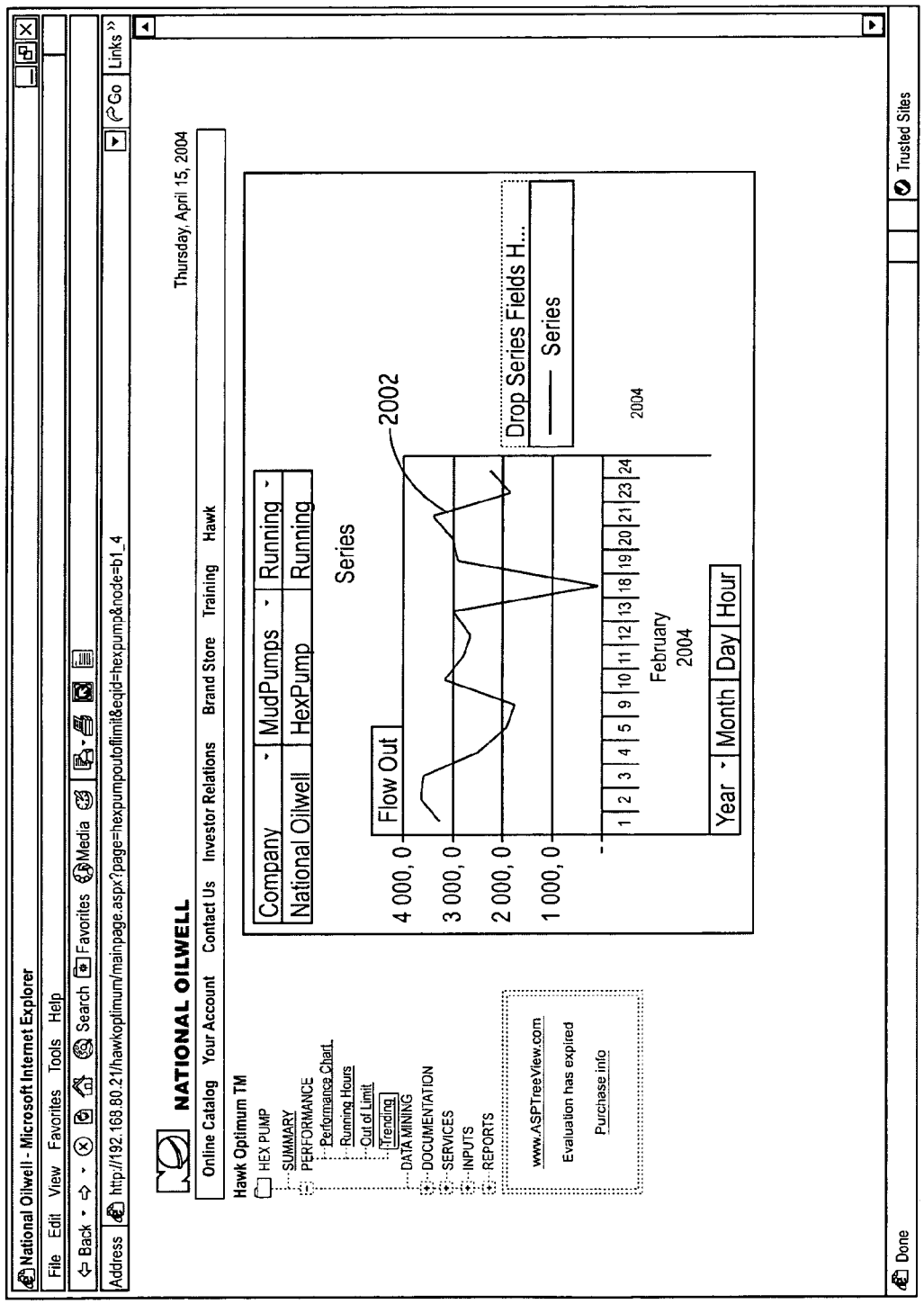
FIG. 20 shows a screen print containing a chart showing the flow from a mud pump, with the flow plotted against time.

FIG. 20 shows a screen print as it might appear at a GUI at 66, 68 or at server 73 containing a chart showing the flow 2002 from a mud pump, with the flow plotted against time. The time span 2004 is in this case the first 24 days of a month. As is evident from the graph, the pump has been running all days except for one.

Figure 21:
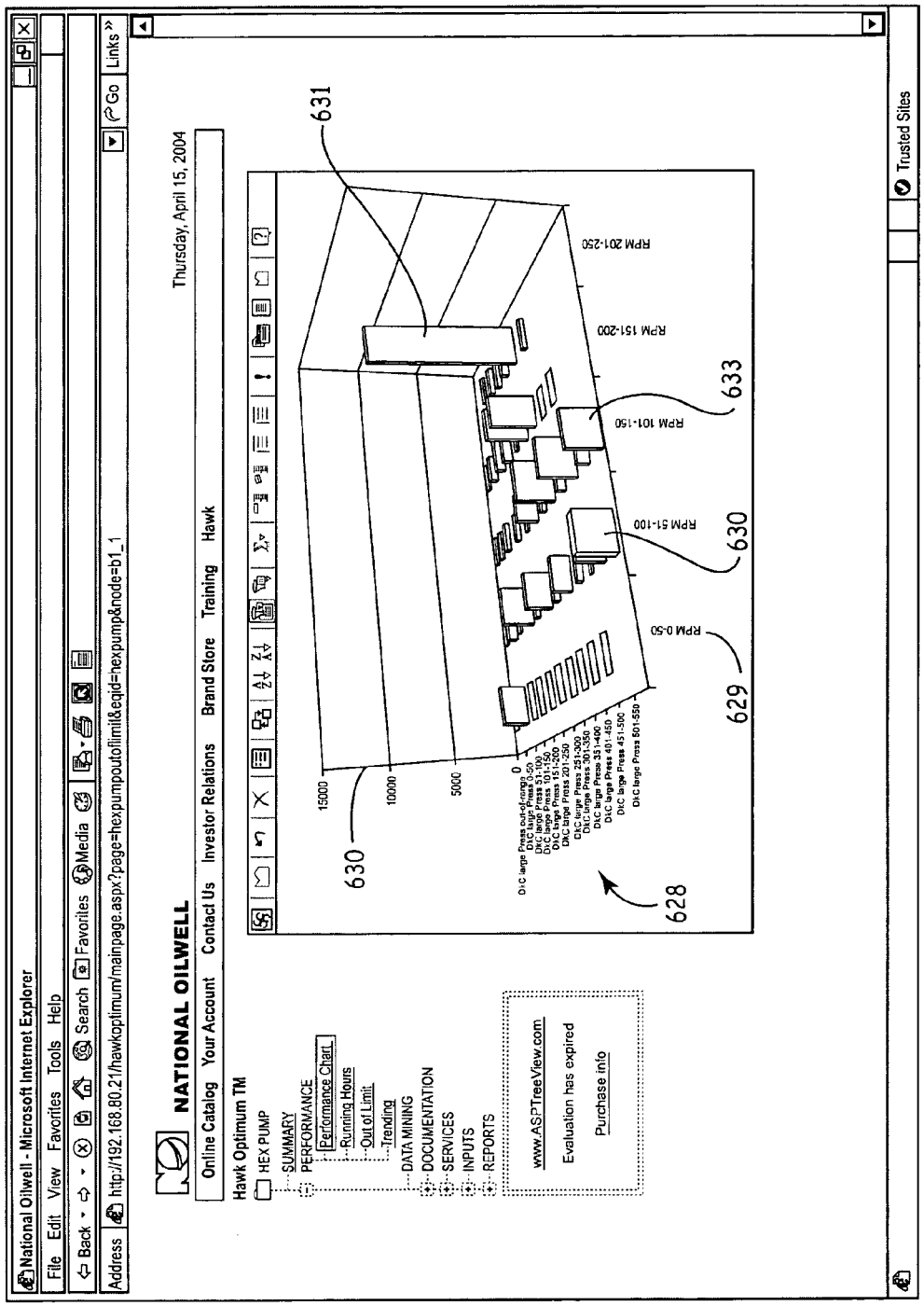
FIG. 21 is a screen print containing a chart showing the discharge pressure distribution in a mud pump against the rotational speed of the pump.

FIG. 21 shows a screen print containing a chart showing the discharge pressure distribution in a mud pump graphed against the rotational speed of the pump. The pressure has been divided into different classes, each covering a span of 50 MPa. This is plotted along the axis 628. The rotational speed has also been divided into different classes, each covering a span of 50 RPM, and plotted along the axis 629. The vertical axis 630 show the number of running hours within each pressure class and revolution speed class. As is evident from the graph the pump has been running for many hours with a moderate pressure and high speed, as denoted by reference number 631. As shown by bars 632 and 633, the pump has also been running for some time with high pressure at a moderate speed. However, for very little time has the pump been running with low speed and high pressure.

Figure 22:
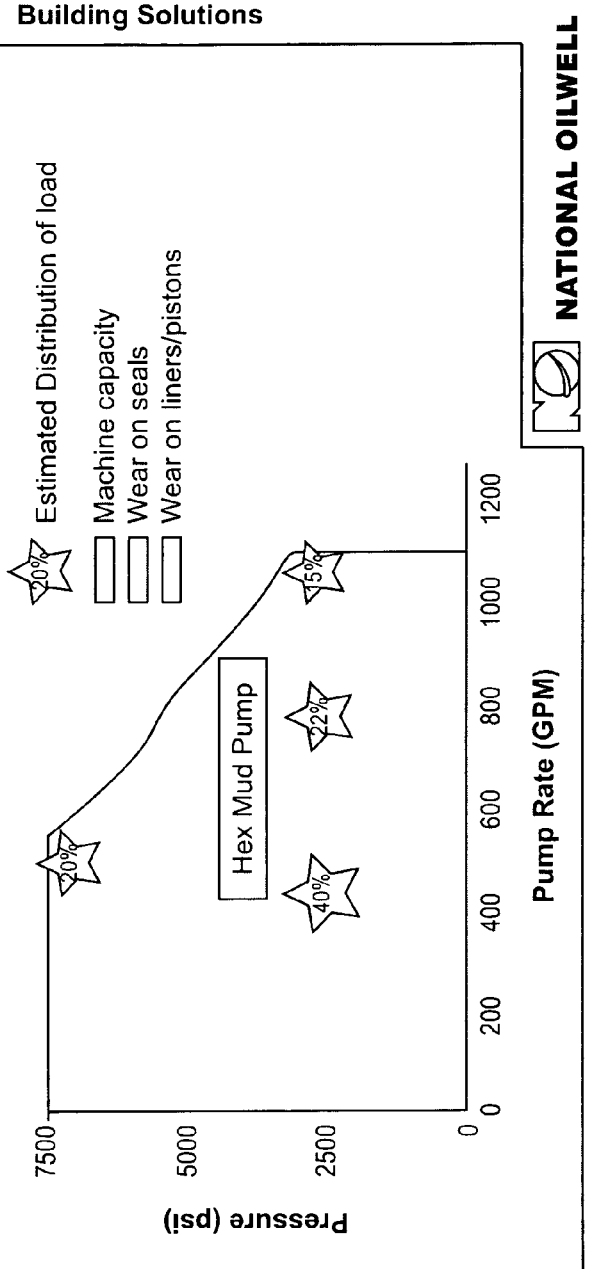
FIG. 22 shows an example of a typical performance chart for a mud pump, showing the distribution of the pump utilization.

By using this technique and also including data from a plurality of pumps, it is possible to make an average utilization profile of the type of pump. FIG. 22 shows an example of a typical performance chart for a mud pump, showing the distribution of the pump utilization. As the chart shows, the pump (or pump type, if a plurality of pumps has been monitored) is used 40% of the time at moderate pressure and pump rate. With the utilization profile as a basis it is possible to predict wear of critical components in the pump. Some components wear to a greater extent in high pressure environments and some wear more in high speed environments. Other components are more susceptible to high temperature and others again are more susceptible to high stress. By evaluating not only the running hours but also taking into account the conditions the equipment has been running in, it is possible to predict more accurately where in the lifespan of the critical components one is at a specific time. For instance, the load may be taken into account so that, e.g., for a pump the running hours is multiplied by the average flow the pump has delivered. Another example is to keep track of the total time the temperature at a certain place in the pump has been in excess of a certain limit, the limit, e.g., being based on a temperature above which a sealing material is susceptible to damage. Any combination of load weighted parameters may be calculated in the system of the present invention. When the load weighted parameter exceeds a set limit a warning may be sent to the operator, informing him of the fact that a component is approaching the end of its life span. Preferably, the warning is sent out well before the expected life span has come to an end, so that there is sufficient time for planning maintenance of the equipment, including component replacement.

In addition to the warning informing the operator of an upcoming maintenance, it is also feasible to send out an alarm if a parameter exceeds a critical limit, indicating that a failure may occur at any time, or that the equipment has to be run at a reduced performance until maintenance has been performed.

The warning and the alarm is sent out via the management database 81 and the content server 78. It can be posted as a message on the user interfaces 66, 68, 86 and 87. In addition, it can be messaged over any media to client interfaces. This can be e-mail, SMS, pagers, etc. Via the B2B server, the system can also send the information digitally to a client management system.

When maintenance has been performed, the parameters forming the basis for the warning or the alarm are set to an initial value, so that the monitoring of the life span can start from fresh again.

It is also possible to perform trend analyses based on experience data. The experience data is a result of an extensive analysis of failures that has occurred in similar equipment previously. If, e.g., a certain bearing has failed and resulted in a major breakdown and possibly also damages on other parts of the equipment or other pieces of equipment, the conditions present at the time before the failure may be analyzed. It is then possible to see if any values or calculated values have undergone a change during the time before the failure. The time span some minutes before the failure is first investigated but the time span within hours or even days or weeks before the failure will also be taken into account.

The results are then compared with results from other similar failures to find out if there is something in common between all or at least some of the failures.

If this correlation of parameters is likely to be connected with the failure, a procedure may be implemented in the computer controlling the pump that based on sensor reading (the on-site computer is not involved in the process, but the lessons learned are implemented into the pump control computer) at regular intervals (the interval depending on how quickly the failure may occur) calculates the correlation between the above factors. If a condition occurs that is similar to the conditions that were present at the time before failure in the previous occurrences, the computer may stop the equipment or, if time allows, perform a controlled shut down of the system that the pump is a part of.

Figure 25:
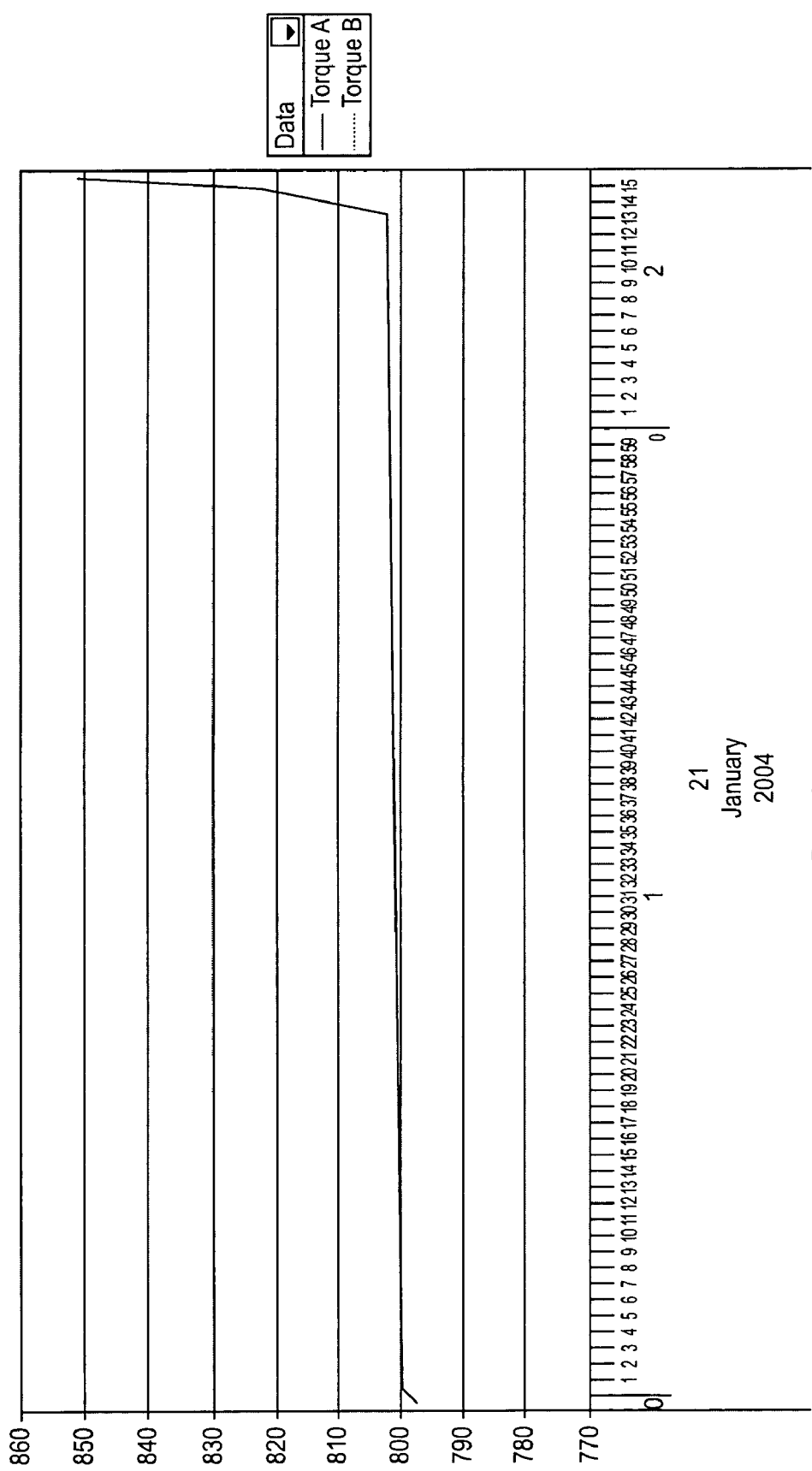
FIG. 25 shows a plot of the torque of two motors A and B running the pump for a period of time starting at 01:00 and showing that at 02:15 a failure of the pump occurred.

An example of this is shown in FIG. 25. This graph shows a plot of the torque of the two motors A and B running the pump for a period of time on Jan. 21, 2004 starting at 01:00. At 02:15 a failure of the pump occurred. The reason, found out later, was that a bearing suddenly failed. As is evident from the graph, the torque of both motor A and B had a remarkable increase from 02:13, increasing with a large gradient until the failure. When the failure occurred this had detrimental consequences to the equipment connected to the pump. This increased torque could not be explained by any outside factors, like increased pump rate or higher viscosity of the pumped fluid. The torque was still within the normal range that the motors were capable of delivering and the pump was able to receive. According to the regular out of limit measurements, an out-of-limit event would not occur, at least not until it was too late to prevent the critical failure.

This example shows one incident only. Nevertheless, the relation between the increased torque and the failure may be likely enough to implement a check for a similar condition in this type of equipment. The condition for such a situation to be considered present may be that if the torque increases with a steep gradient, e.g. above 200 Nm/s, for more than 20 seconds and there is no increase in input or viscosity or other factors that will naturally influence the torque, an alarm will go off or the computer operating the pump will perform a controlled shut down.

An upcoming failure may also be indicated by conditions that develop more slowly than within a couple of minutes. For instance experience may have shown that if a sealing has been subject to a temperature above a certain value or a period of time, this will increase the risk of leakage substantially. However, the leakage will not occur until the pressure is above a certain value. If such a situation occurs the computer operating the equipment will be told to operate the equipment so that a pressure limit is not exceeded. At the same time the operator will receive a message informing him of the situation.

If the rate-of-change for a temperature parameter is of importance to predict a problem, the algorithm module (e.g., at post-processor 83) may calculate the rate-of-change. The performance limit may have an entry defining the limit for when this rate-of-change is outside its normal operating environment.

By implementing algorithms that can foresee a failure based on previous experience, the chances of a critical failure can be substantially reduced. These algorithms can be installed in the management database 81 much the same way as the initial set-up of the on-site computer.

Load weighted running hours can be used as a basis for total estimated lifetime for a wear part, and is hence a typical performance limit. The limit can be adjusted as broader and broader experience is gained. By checking the load weighted running hour accumulator against this limit, it is possible to predict remaining lifetime under similar conditions and operation, propose inspection intervals, propose ordering of spare parts, etc.

The theoretical model for this trend analysis is preferably managed as tables and records in a database, with a web-based user interface. An internal product champion can be authorized to maintain the model, and it can grow incrementally as new knowledge about the equipment is gained. For example, data mining can be used to identify data patterns that may be used to predict failure of different aspects of a single component, based on different operating conditions experienced by different components. Neural networks may be used to identify the patterns and also to detect their re-occurrence.

Figure 23:
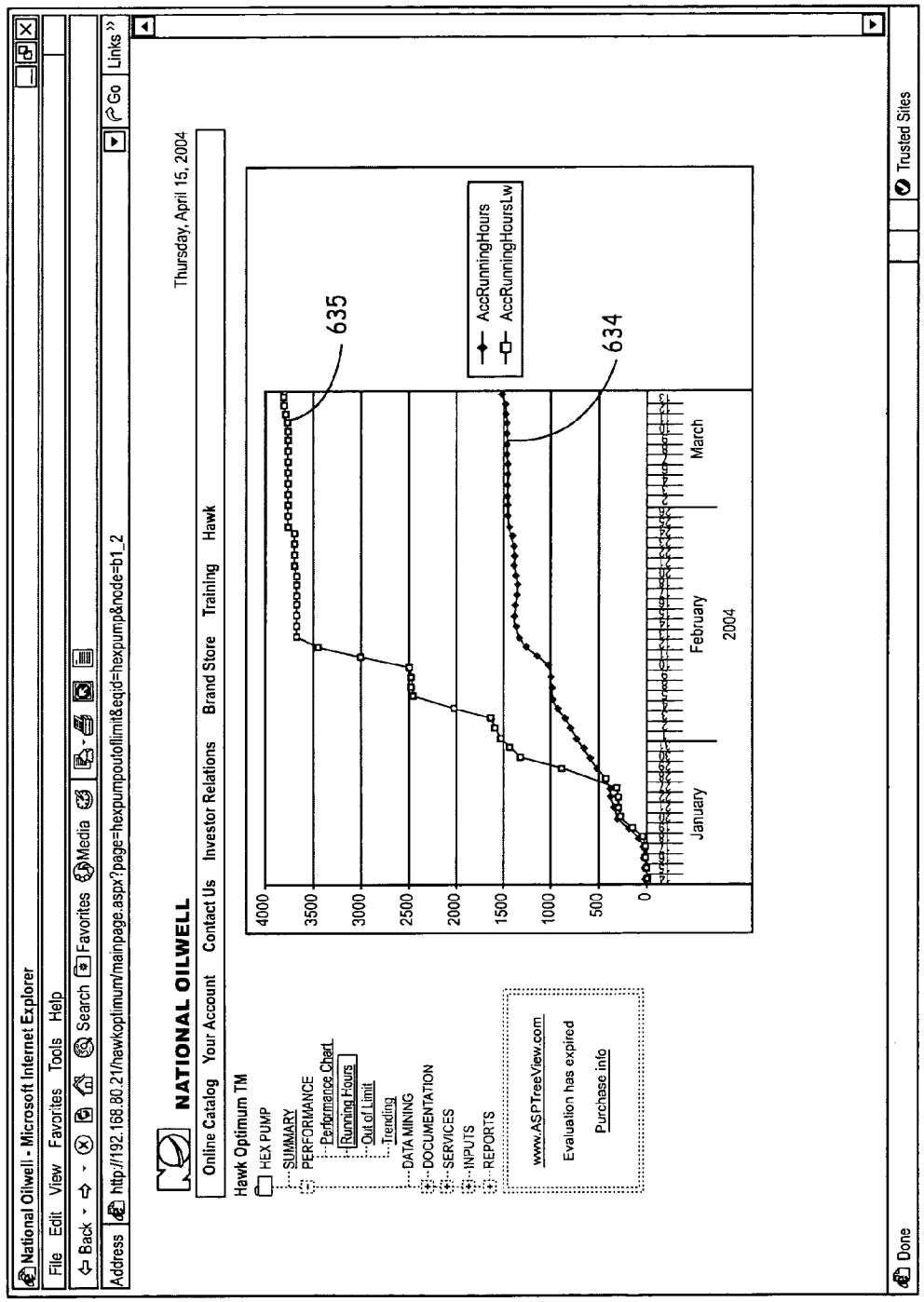
FIG. 23 shows a screen print containing a chart of the running hours of a mud pump.
Figure 24:
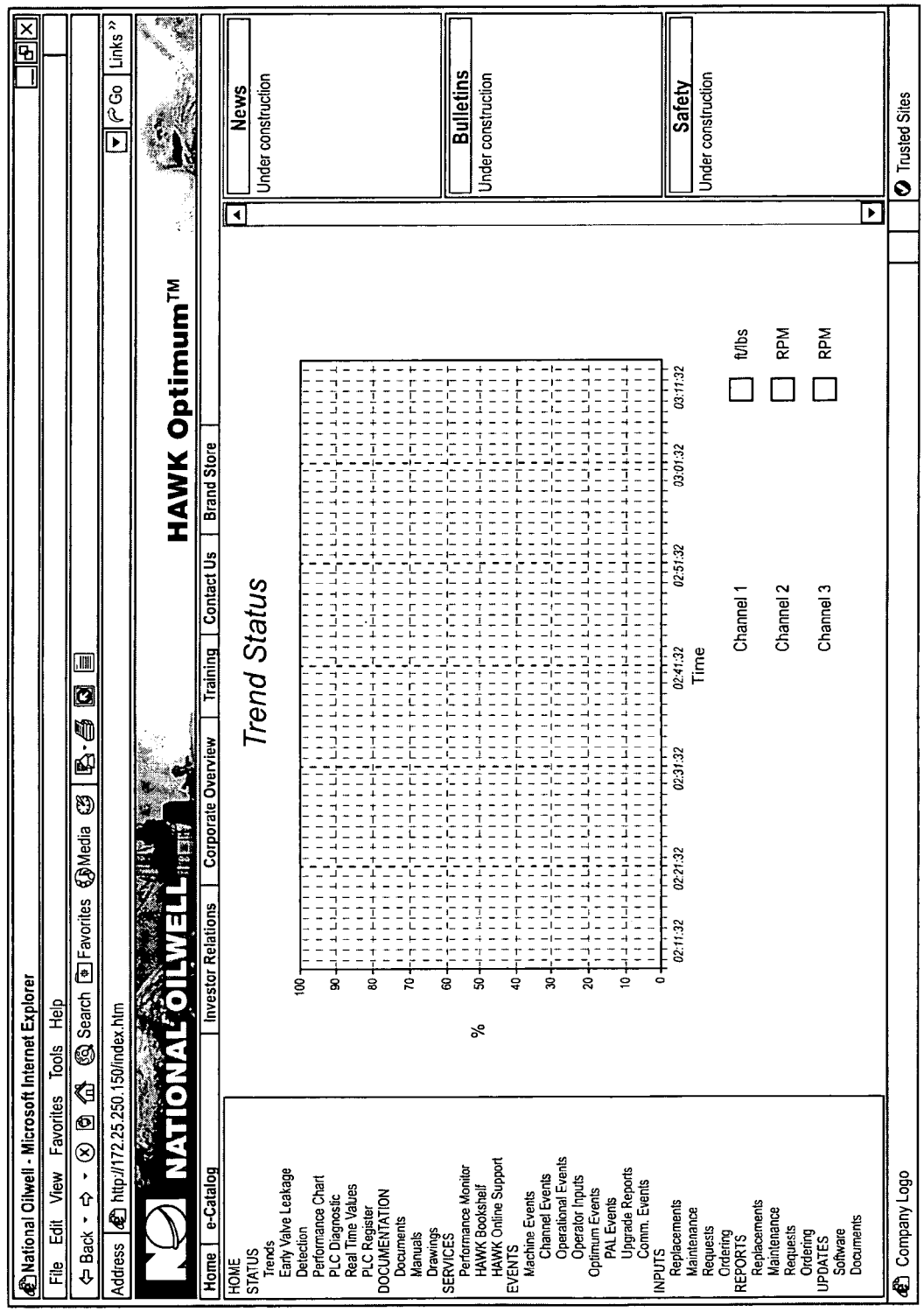
FIG. 24 shows a screen print containing a chart of the use of a mud pump with reports minute-by-minute.

In addition to the lifespan monitoring, trend analysis and an out of limit surveillance, it is also possible to monitor the equipment in real time. FIG. 23 shows a screen dump containing a chart of the running hours of a mud pump. The graph 634 shows the running hours as such for each day in the year 2004 until 13$^{th}$ May, which is the date of the screen dump. The graph 635 shows the load weighted running hours for the same period. It is possible to select a narrower time span, so that the pump can be monitored minute for minute. This is shown in a graph display format as in FIG. 24, where, incidentally, the pump has been standing still. If the pump had been running, a graph would show indicating the usage percentage of the pump versus time. Such a display can be updated continuously in real time.

The embodiment of the invention described in connection with FIG. 11 et seq. may provide one or more of the following benefits:

An on-site computer functioning as a "local" web-server. In addition to the sensor data link 304, 404, described in FIG. 1, there is in the embodiment of FIG. 11 a web server embodied in the same computer processor, or in a processor adjacent to the sensor data link. This will perform:

Presenting snapshots and trends of real-time values (no calculation, comparison with duty load profiles, etc has been performed at this stage).

Presenting documents and drawings stored on the local web server (if not in contact with the computer network).

Data can be monitored directly on-site without having to go through the network.

Multidimensional cubes, using OLAP (On Line Analytical Processing) and MDX (Multi-Dimensional Expressions) as a method of storing, facilitates the searching and retrieving of the huge amount of data necessary to implement the service. The general outline and use of multidimensional cubes is well known to a skilled programmer. A person of skill in multidimensional cubes will readily understand how to implement the functionality described above in multidimensional cubes.

Another service that can be implemented is publication of news and important safety information from the service provider back out to the local monitors (operator and company personnel). If there is, e.g., a new safety bulletin for a specific type of machine to be released, this will be "posted" on the machine type in the management database. The header of the publication will be put on the outbound queue. The next time the on-site computer connects to the system to deliver data (if it is not constantly on-line), it will also check the outbound queue, and transfer the heading to the on-site computer. On the on-site local monitor, it will appear as a heading in a separate window of the user interface. When any user selects the heading, he can confirm that he wants the full article downloaded next time or immediately. The on-site computer will then at next reconnect put a request via the inbound queue to the configuration file generator. This process will in turn invoke the content server to put the whole article to the outbound queue. This will minimize the transfer of data to the amount needed by the operator or other personnel in the company.

The system may be designed to both propose and report maintenance actions. It can publish maintenance actions to the on-site computer in the same way as it publishes news and bulletins. The source of this information can be maintenance algorithms which take actual load weighted use of the machine into consideration, i.e., it can propose an action for inspection of a bearing every 14 days if the load applied to the machine is dominated by a heavy speed component, or adjust the same interval to 2 months if the applied load is dominated by pressure components.

Just like for the bulletin, the operator opens a maintenance header. He can also check a box and fill in status for the action, and post it back to the system. At next connection, the service report is transmitted into the database, where it is correlated to all other data.

Each on-site computer can carry the documentation for the machine it is monitoring. The as-built version of the documentation can be uploaded at installation. During operation, the service provider can publish new or updated documents through the management database.

Just like for the news and bulletins, it is possible to post headings only first. Operators can check or confirm that they want the new documentation uploaded at the next reconnect.

Although the present invention has been described with reference to preferred embodiments, persons skilled in the art will recognize that changes may be made in form and detail without departing from the spirit and scope of the invention.

The invention claimed is:

1. A system for managing replaceable components for equipment having a plurality of components, each component having a limited useful life, comprising:
   a computer with at least one processor;
   a computer program module for defining a duty profile comprising a plurality of usage cases for the equipment, each usage case involving two or more of the plurality of components and specified operating conditions assumed to be experienced by the involved components during the execution of each of the usage cases;
   a computer program module for determining a theoretical useful life for each component involved in the duty profile, said theoretical useful life being based on component wear parameters assumed to occur under the specified operating conditions;
   sensors for determining and monitoring the occurrence of equipment operation corresponding to a usage case and making measurements of actual operating conditions experienced in the equipment operation;
   a memory for storing the measurements of actual operating conditions for the plurality of components; and
   a computer program module for computing an adjusted theoretical useful life for a component after the component has experienced one or more operations, by:
   responsive to the measurements of actual operating conditions, calculating one or more wear parameters for each operation and accumulating these calculated parameters for such component; and
   based on a comparison of the accumulated, calculated one or more wear parameters from actual operating conditions to accumulated wear parameters assumed to occur under the specified operating conditions in the determination of a theoretical useful life, determining the amount of the adjusted theoretical useful life consumed in the one or more operations.

2. The system of claim 1 wherein the measurements of actual operating conditions comprise measurements of load and the duration of a load.

3. The system of claim 1 wherein the duty profile assumes a specified number of operations and the system tracks the number of operations in which a replaceable component is involved.

4. The system of claim 1 wherein the sensors are configured to provide measurements of actual operating conditions for calculation of a wear parameter corresponding to the work performed by a component.

5. The system of claim 1 further comprising a computer program module responsive to the adjusted theoretical useful life for signaling an immediate replacement need when the amount of the theoretical useful life consumed is within a critical range of the adjusted theoretical useful life.

6. The system of claim 1 further comprising a computer program module responsive to the adjusted theoretical useful life for signaling a scheduled replacement need when the amount of the theoretical useful life consumed is within a replacement range of the adjusted theoretical useful life.

7. The system of claim 1 wherein the equipment is remote from the computer program module for computing an adjusted theoretical useful life for a component and the sensors are resident on the equipment.

8. The system of claim 7 wherein the sensors resident on the equipment are configured by a computer program module operating on a processor remote from the equipment to produce selected measurements of actual operating conditions.

9. The system of claim 7, wherein the sensors resident on the equipment communicate with a computer associated with the equipment.

10. The system of claim 1 further comprising a supervisory computer module for computing the adjusted theoretical useful life for a component in response to a real-time request received by the supervisory computer module or in response to a periodic analysis initiated by the supervisory computer module.

11. A computer-based method for managing replaceable components for equipment having a plurality of components, each component having a limited useful life, comprising:
 controlling a computer program module executing on a processor for defining a duty profile comprising a plurality of usage cases for the equipment, each usage case involving two or more of the plurality of components and specified operating conditions assumed to be experienced by the involved components during the execution of each of the usage cases;
 controlling a computer program module executing on a processor for determining a theoretical useful life for each component involved in the duty profile, said theoretical useful life being based on component wear parameters assumed to occur under the specified operating conditions;
 receiving data from sensors for determining and monitoring the occurrence of equipment operation corresponding to a usage case and for making measurements of actual operating conditions experienced in the equipment operation;
 storing in a memory the measurements of actual operating conditions forte plurality of components; and
 controlling a computer program module executing on a processor for computing an adjusted theoretical useful life for a component after the component has experienced one or more operations, by:
  responsive to the measurements of actual operating conditions, calculating one or more wear parameters for each operation and accumulating these calculated parameters for such component; and
  based on a comparison of the one or more accumulated, calculated wear parameters from actual operating conditions to accumulated wear parameters assumed to occur under the specified operating conditions in the determination of a theoretical useful life, determining the amount of the adjusted theoretical useful life consumed in the one or more operations.

12. The computer-based method of claim 11 wherein step of making the measurements of actual operating conditions comprises making measurements of load and the duration of a load.

13. The computer-based method of claim 11 wherein the step of controlling a computer program module for defining a duty profile comprises controlling a module that assumes a specified number of operations and the step of controlling a computer program module for computing an adjusted theoretical useful life comprises tracking the number of operations in which a replaceable component is involved.

14. The computer-based method of claim 11 wherein the step of receiving data from sensors comprises receiving data from sensors configured to provide measurements of actual operating conditions for calculation of a wear parameter corresponding to the work performed by a component.

15. The computer-based method of claim 11 further comprising controlling a computer program module executing on a processor responsive to the adjusted theoretical useful life for signaling an immediate replacement need when the amount of the theoretical useful life consumed is within a critical range of the adjusted theoretical useful life.

16. The computer-based method of claim 11 further comprising controlling a computer program module executing on a processor responsive to the adjusted theoretical useful life for signaling a scheduled replacement need when the amount of the theoretical useful life consumed is within a replacement range of the adjusted theoretical useful life.

17. The computer-based method of claim 11 wherein the step of receiving data from sensors comprises receiving data from sensors resident on equipment located remote from the computer program module for computing an adjusted theoretical useful life for a component.

18. The computer-based method of claim 17 further comprising configuring the sensors resident on the remote equipment by use of a computer program module operating on a supervisory server remote from the equipment.

19. The computer-based method of claim 17, wherein the step of receiving data from sensors comprises receiving data from sensors communicating with a computer associated with the remote equipment.

20. The computer-based method of claim 11 further comprising controlling a supervisory computer module executing on a computer for computing the adjusted theoretical useful life for a component in response to a real-time request received by the supervisory computer module or in response to a periodic analysis initiated by the supervisory computer module.

21. A method for monitoring of the condition of remote equipment having at least one wear component, said at least one wear component having a useful life dependent on the operating conditions the at least one wear component experiences, comprising:
 defining two or more raw data measurements tat vary as the remote equipment is used under different operating conditions;
 controlling a software component executing on a processor for receiving data from sensors cooperating with the remote equipment to sense operating conditions and producing the two or more raw data measurements and for transmitting said sensor data to a central monitoring processor;
 controlling a software component executing at the central monitoring processor for parsing the sensor data into the two or more raw data measurements for processing;
 controlling a software component executing on a processor for calculating from the two or more raw data measurements at least one calculated wear parameter for the at least one wear component, the value of the at least one calculated wear parameter being weighted by values of the two or more raw data measurements used in the at least one calculated wear parameter calculation;
 controlling a software component executing on a processor for collecting a time sequence of the values of the at least one calculated wear parameter for the at least one wear component and from the time sequence of values calculating an accumulated wear value over the usage of the at least one wear component; and
 controlling a software component executing on a processor for evaluating the accumulated wear value against a maximum wear rating for the at least one wear component and responsive thereto providing a useful life operations notice.

22. The method of claim 21 wherein the step of evaluating the accumulated wear value and providing a useful life operations notice comprises providing an operator notice to change equipment operating conditions to preserve useful life.

23. The method of claim 21 wherein the step of evaluating the accumulated wear value and providing a useful life operations notice comprises providing a supervisory notice for emergency maintenance.

24. The method of claim 21 wherein the step of evaluating the accumulated wear value and providing a useful life operations notice comprises providing a supervisory notice for scheduled replacement at a time responsive to the accumulated wear value and remaining useful life.

25. The method of claim 21 further comprising controlling a software component executing on a processor for collecting a time sequence of the values of the at least one calculated wear parameter for a sample population of equipment using such at least one wear component and from such time sequence of values and failure data for at least one wear components in such sample population, determining a wear-failure correspondence between the time sequence of the values of the at least one calculated wear parameter and wear component failure.

26. The method of claim 25 further comprising controlling a software component executing on a processor responsive to such wear-failure correspondence and further responsive to such time sequence of the values of the at least one calculated wear parameter for the at least one wear component for calculating a remaining useful life for such at least one wear component.

27. The method of claim 21 further comprising controlling a software component executing on a processor for collecting a time sequence of the values of the at least one calculated wear parameter and the raw data measurements underlying such at least one calculated wear parameter for a sample population of equipment using such at least one wear component and from such time sequence of values and measurements and failure data for at least one wear component in such sample population, determining a wear-failure correspondence between the time sequence of the values of the at least one calculated wear parameter and the raw data measurements underlying such at least one calculated wear parameter and incidents of wear component failure.

28. The method of claim 27 further comprising controlling a software component executing on a processor responsive to such wear failure correspondence to apply such wear failure correspondence as a filter to at least one calculated wear parameter and the raw data measurements underlying such at least one calculated wear parameter for an item of equipment corresponding to the sample population of equipment to detect a pre-failure pattern and responsive to such detection to provide an operating notice for the item of equipment.

29. The method of claim 28 wherein the operating notice provided is a notice specifying controlled shutdown for the item of equipment at which the pre-failure pattern was detected.

30. The method of claim 28 wherein the operating notice provided is a notice specifying an operating limit for the item of equipment at which the pre-failure pattern was detected.

31. The method of claim 21 wherein the method further comprises:
defining a 2-dimensional usage limit for the at least one wear component, each dimension comprising a limit for a raw data measurement or for the at least one calculated wear parameter, and
controlling a software component executing on a processor using the 2-dimensional usage limit, said software component being responsive to the raw data measurements and the at least one calculated wear parameter, for issuing an out-of-limit warning.

32. The method of claim 21 wherein the method further comprises:
defining a N-dimensional usage limit for the at least one wear component, each dimension comprising a limit fir a raw data measurement or for the at least one calculated wear parameter; and
controlling a software component executing on a processor using the N-dimensional usage limit, said software component being responsive to the raw data measurements and the at least one calculated wear parameter, for issuing an out-of-limit warning.

33. The method of claim 21 wherein the method further comprises controlling a software component executing on a processor remote from the equipment to be monitored to configure an equipment computer system located at the equipment, by defining at least one of the raw data measurements to be produced and the frequency of sensing of the at least one raw data measurement.

34. The method of claim 33 wherein the step of controlling a software component executing on a processor remote from the equipment to be monitored to configure an equipment computer system comprises providing configuration data specifying one or more of the following: selecting wear components to monitor, selecting the signals and parameters for a data logger in the equipment computer system, selecting scaling calculations to be applied to raw data measurements, selecting filters to be applied to raw data measurements, and selecting a communication route between the equipment computer system and the central monitoring processor.

35. The method of claim 21 further comprising:
storing in a component usage database accessible to the central monitoring processor raw data measurements and/or calculated wear parameters;
storing in a failure database accessible to the central monitoring processor failure data for at least one wear component correlated to the component usage database;
controlling a software component executing on a processor for performing data mining on the component usage database and failure database to derive at least one predictive rule for triggering a warning in advance of failure of a wear component; and
controlling a software component executing on a processor for implementing the at least one predictive ride as a filter to be applied to real time streams of raw data measurements received from the sensors cooperating with the remote equipment.

36. The method of claim 35 further comprising:
storing in a limit database accessible to the central monitoring processor out of limit levels for comparison against the raw data measurements and/or calculated wear parameters; and
controlling a software component executing on a processor for implementing the out of limit levels as a filter to be applied to real time streams of raw data measurements received from the sensors cooperating with the remote equipment said filter signaling an out of limit condition.

37. The method of claim 35 wherein the raw data measurements of the component usage database are stored in multidimensional cubes.

38. The method of claim 35 wherein the calculated wear parameters of the component usage database are stored in multidimensional cubes.

39. The method of claim 35 wherein the at least one predictive rule is fed back into definitions for service procedures that define component replacement schedules.

40. The method of claim 21 wherein at least one accumulated, calculated wear parameter is a load-weighted running hour parameter.

41. The method of claim 21, wherein the remote equipment to which the method is applied has two or more wear components that are replaceable.

42. The method of claim 21, wherein the remote equipment to which the method is applied is selected from the group consisting of cranes, winches, top-drives and mud pumps.

43. The method of claim 21, further comprising storing in a management database accessible to the central monitoring processor the correspondence between raw data measurements and the calculated wear parameters to which the raw data measurements belong.

44. The method of claim 43, further comprising storing in a management database accessible to the central monitoring processor the processing calculation methods applied to the two or more raw data measurements.

* * * * *

UNITED STATES PATENT AND TRADEMARK OFFICE
CERTIFICATE OF CORRECTION

PATENT NO. : 7,143,007 B2 Page 1 of 1
APPLICATION NO. : 10/965706
DATED : November 28, 2006
INVENTOR(S) : Wayne R. Long It is certified that error appears in the above-identified patent and that said Letters Patent is hereby corrected as shown below:

Specification:

| Col. | Line | PTO | Should Read |
|---|---|---|---|
| 17 | 37 | " xactual " | -- x actual -- |

Claims:

| Col. | Line | PTO | Should Read |
|---|---|---|---|
| 29 | 33 | " forte " | -- for the -- |
| 30 | 35 | " tat " | -- that -- |
| 29 | 49 | " wherein step " | -- wherein the step -- |
| 32 | 9 | " fir " | -- for -- |

Signed and Sealed this

Twenty-seventh Day of March, 2007

JON W. DUDAS
*Director of the United States Patent and Trademark Office*